US012578176B2

(12) United States Patent
Lassalle-Balier et al.

(10) Patent No.: US 12,578,176 B2
(45) Date of Patent: Mar. 17, 2026

(54) ANGLE SENSOR USING EDDY CURRENTS AND HAVING HARMONIC COMPENSATION

(71) Applicant: Allegro MicroSystems, LLC, Manchester, NH (US)

(72) Inventors: Rémy Lassalle-Balier, Bures sur Yvette (FR); Alexander Latham, Harvard, MA (US)

(73) Assignee: Allegro MicroSystems, LLC, Manchester, NH (US)

( * ) Notice: Subject to any disclaimer, the term of this patent is extended or adjusted under 35 U.S.C. 154(b) by 92 days.

(21) Appl. No.: 18/187,919

(22) Filed: Mar. 22, 2023

(65) Prior Publication Data

US 2024/0318950 A1 Sep. 26, 2024

(51) Int. Cl.
*G01B 7/30* (2006.01)
*G01D 5/20* (2006.01)

(52) U.S. Cl.
CPC ................ *G01B 7/30* (2013.01); *G01D 5/20* (2013.01)

(58) Field of Classification Search
CPC .......... G01B 7/30; G01D 5/20; G01D 5/2006; G01D 5/2013; G01D 5/202; G01D 5/2026; G01D 5/2033; G01D 5/204; G01D 5/2046; G01D 5/2053; G01D 5/206; G01D 5/2066; G01D 5/2073; G01D 5/208; G01D 5/22; G01D 5/2208; G01D 5/2216; G01D 5/2225; G01D 5/2233; G01D 5/2241; G01D 5/225; G01D 5/2258; G01D 5/2266; G01D 5/2275; G01D 5/2283; G01R 33/0005;
(Continued)

(56) References Cited

U.S. PATENT DOCUMENTS 2,900,612 A * 8/1959 Tripp ..................... H01F 21/04
336/200
6,111,403 A 8/2000 Yokotani et al.
(Continued)

FOREIGN PATENT DOCUMENTS

CN 1950676 W 4/2007
CN 117470281 A * 1/2024
(Continued)

OTHER PUBLICATIONS

Office Action dated Jun. 4, 2025 for U.S. Appl. No. 18/354,903, 13 pages.
(Continued)

*Primary Examiner* — David M Schindler
(74) *Attorney, Agent, or Firm* — DALY, CROWLEY, MOFFORD & DURKEE LLP

(57) ABSTRACT

Methods and apparatus for sensors having a main coil to direct a magnetic field at a rotatable target for inducing eddy currents in the target and a receive coil having sine and cosine coils for detecting a reflected field from the target wherein each of the sine and cosine coils is configured such that an asymmetric reflected field from the target seen by the sine and cosine coils corresponds to conductive properties of a surface of the target in relation to the main coil and the receive coil. The sine coil comprises first and second constituent coils offset from each other to compensate for third order harmonic effects and the cosine coil comprises first and second constituent coils to compensate for third order harmonic effects.

16 Claims, 30 Drawing Sheets

(58) Field of Classification Search

CPC ............. G01R 33/0017; G01R 33/007; G01R 33/028; G01V 3/10; G01V 3/101; G01V 3/102; G01V 3/104; G01V 3/105; G01V 3/107; G01V 3/108; G01V 3/12; G01V 3/15; G01V 3/165; G01V 3/081

See application file for complete search history.

(56) References Cited

U.S. PATENT DOCUMENTS

| | | | |
|---|---|---|---|
| 6,642,711 B2 | 11/2003 | Kawate et al. | |
| 7,009,384 B2 | 3/2006 | Heremans et al. | |
| 8,453,518 B2 | 6/2013 | Diekmann et al. | |
| 9,983,045 B2 | 5/2018 | O'Neill | |
| 10,145,908 B2 | 12/2018 | David et al. | |
| 10,330,499 B2 | 6/2019 | Elliott et al. | |
| 10,495,699 B2 | 12/2019 | Burdette et al. | |
| 11,079,291 B2 | 8/2021 | Bertin | |
| 11,112,230 B2 | 9/2021 | Latham et al. | |
| 11,112,275 B2 | 9/2021 | Bertin | |
| 11,326,903 B1 | 5/2022 | Casu et al. | |
| 11,366,141 B1 | 6/2022 | Daubert et al. | |
| 11,408,755 B2 | 8/2022 | Bertin | |
| 11,435,206 B2 | 9/2022 | Drouin | |
| 11,460,286 B2 | 10/2022 | Gillet et al. | |
| 11,555,716 B1 | 1/2023 | Rigoni et al. | |
| 11,592,319 B2 | 2/2023 | Ausserlechner | |
| 11,662,260 B2 | 5/2023 | Latham et al. | |
| 11,692,887 B2 | 7/2023 | Witts et al. | |
| 2003/0057941 A1* | 3/2003 | Collier-Hallman | ..... G01P 3/487 |
| | | | 701/42 |
| 2005/0225320 A1 | 10/2005 | Lee | |
| 2006/0104558 A1 | 5/2006 | Gallion et al. | |
| 2007/0001666 A1 | 1/2007 | Lee | |
| 2014/0117980 A1* | 5/2014 | Ely | ...................... G01D 5/2046 |
| | | | 324/207.17 |
| 2015/0022193 A1 | 1/2015 | Burdette et al. | |
| 2015/0362336 A1 | 12/2015 | Cook | |
| 2017/0166251 A1 | 6/2017 | Shao et al. | |
| 2017/0276740 A1* | 9/2017 | Schmitt | ............... G01R 33/091 |
| 2018/0340911 A1 | 11/2018 | Romero | |
| 2018/0340986 A1 | 11/2018 | Latham et al. | |
| 2018/0340987 A1 | 11/2018 | Latham et al. | |
| 2018/0340988 A1 | 11/2018 | Latham et al. | |
| 2018/0340989 A1 | 11/2018 | Latham et al. | |
| 2018/0340990 A1 | 11/2018 | Latham et al. | |
| 2018/0356254 A1* | 12/2018 | Kegeler | ................ G01L 5/0023 |
| 2019/0242725 A1 | 8/2019 | Shaga et al. | |
| 2019/0265018 A1* | 8/2019 | Latham | .............. G01R 33/0017 |
| 2022/0187387 A1 | 6/2022 | Casu et al. | |
| 2022/0239462 A1 | 7/2022 | Casu et al. | |
| 2022/0341758 A1* | 10/2022 | Bertin | .................. G01D 5/2073 |
| 2023/0332965 A1 | 10/2023 | Casu et al. | |
| 2023/0417579 A1 | 12/2023 | Latham et al. | |
| 2024/0110777 A1 | 4/2024 | Casu et al. | |
| 2024/0146253 A1 | 5/2024 | Romero et al. | |
| 2024/0219248 A1 | 7/2024 | Lehndorff et al. | |
| 2025/0027760 A1 | 1/2025 | Richards et al. | |
| 2025/0029780 A1 | 1/2025 | Lassalle-Balier et al. | |
| 2025/0102287 A1 | 3/2025 | Casu et al. | |

FOREIGN PATENT DOCUMENTS

| | | |
|---|---|---|
| EP | 4394331 33 | 7/2024 |
| WO | WO 2022/132229 50 | 6/2022 |

OTHER PUBLICATIONS

Response to Office Action dated Jun. 4, 2025, filed on Aug. 28, 2025 for U.S. Appl. No. 18/354,903, 14 pages.

Partial Search Report dated Nov. 29, 2024 for European Application No. 24185072.6, 14 pages.

Extended European Search Report dated Mar. 17, 2025 for European Application No. 24185072.6; 15 pages.

Response to Extended European Search Report dated Mar. 17, 2025, filed on Oct. 7, 2025 for European Application No. 24185072.6; 26 pages.

Search Report and Written Opinion dated Oct. 4, 2024 for PCT Application No. PCT/US2024/034944; 15 pages.

* cited by examiner

FIG. 5

Cosine Coil

604

Sine Coil

602

Main Coil

600

606

604

602

600

ANGLE SENSOR USING EDDY CURRENTS AND HAVING HARMONIC COMPENSATION

BACKGROUND

Magnetic field sensors are often used to detect a ferromagnetic target. For example, it is common to use high frequency magnetic field generation and detection to determine features of a conductive target. In particular, in NDT (Non-Destructive Testing) this is done to detect cracks or other defects in metals. Magnetic field sensors may act as sensors to detect motion or position of the target. Such sensors are ubiquitous in many areas of technology including robotics, automotive, manufacturing, etc. For example, a magnetic field sensor may be used to detect when a vehicle wheel locks up which triggers the vehicle control processor to engage the anti-lock braking system. In this example, the magnetic field sensor may detect rotation of the wheel. Magnetic field sensors may also detect distance to an object. For example, a magnetic field sensor may be used to detect the position of a hydraulic piston. Magnetic field sensors are also used to determine angular position information for a rotating target.

SUMMARY

Example embodiments of the disclosure provide method and apparatus for harmonic compensation in angle sensors having a main coil, which may be referred to as a transmit coil, to generate magnetic fields that are reflected by a target with a conductive surface where the reflected field is generated by eddy currents in the conductive surface of the target. In embodiments, a target comprises a cylinder with an end cut at an angle. Magnetic field sensors, e.g., pick-up or receive coils, can pick up the reflected field, which can be processed to determine an angular position of the target. In embodiments, quadrature receive coils can be used to receive the reflected field and generate sine and cosine signals for processing.

In embodiments, a transmit coil directs a magnetic field at a conductive target for inducing eddy currents in the target with one or more differential receive coils for detecting the reflected field from the target. In embodiments, the pick-up coil(s) are such that the average field from the main coil on a pick-up coil(s) is substantially zero. The average reflected field seen by the pick-up coil(s) is dependent on the angle of the surface of the conductive target in relation to the main and pick-up coil(s). A processing module is configured to process the reflected field seen by the pick-up coil(s) and determine the angular position of the target.

In embodiments, receive coils comprise additional coils positioned to reduce residual angle error by compensating for harmonic signals in angle sensors using inductive sensing of a slanted target. Without compensation, harmonic effects may cause mismatch in the sine and cosine channels from the sensing elements resulting in angle inaccuracy. In example embodiments, main harmonic errors in the sine and cosine signals are corrected directly by coils configured so that only high harmonics indices (with low amplitudes) remain. This may simplify harmonic compensation processing.

In one aspect, a sensor comprises: a main coil to direct a magnetic field at a rotatable target for inducing eddy currents in the target; a receive coil having sine and cosine coils for detecting a reflected field from the target wherein each of the sine and cosine coils is configured such that an asymmetric reflected field from the target seen by the sine and cosine coils corresponds to conductive properties of a surface of the target in relation to the main coil and the receive coil, wherein the sine coil comprises first and second constituent coils offset from each other to compensate for third order harmonic effects and the cosine coil comprises first and second constituent coils to compensate for third order harmonic effects; and a processing module to process the reflected magnetic field from the receive coil for determining an angular position of the target.

A sensor can further include one or more of the following features: the first and second constituent coils of the sine coil are offset from each other by sixty degrees, the respective first and second constituent coils of the sine and cosine coils each comprise butterfly coils, the sine coil further comprises third and fourth constituent coils offset from each other to compensate for fifth order harmonic effects and the cosine coil further comprises third and fourth constituent coils to compensate for fifth order harmonic effects, the respective third and fourth constituent coils of the sine and cosine coils each comprise butterfly coils, an offset for the first, second, third and fourth constituent coils of the sine coil comprises 36 degrees, the sine coil further comprises fifth and sixth constituent coils offset from each other to compensate for seventh order harmonic effects and the cosine coil further comprises fifth and sixth constituent coils to compensate for seventh order harmonic effects, the respective fifth and sixth constituent coils of the sine and cosine coils each comprise butterfly coils, the sensor comprises an angle sensor IC package, the target comprises a cylinder with an end cut at an angle, the third order harmonic effects substantially comprise vertical offset error, and/or the sine and cosine coils are substantially planar.

In another aspect, a method comprises: employing, in a sensor, a main coil to direct a magnetic field at a rotatable target for inducing eddy currents in the target; employing a receive coil having sine and cosine coils for detecting a reflected field from the target wherein each of the sine and cosine coils is configured such that an asymmetric reflected field from the target seen by the sine and cosine coils corresponds to conductive properties of a surface of the target in relation to the main coil and the receive coil, wherein the sine coil comprises first and second constituent coils offset from each other to compensate for third order harmonic effects and the cosine coil comprises first and second constituent coils to compensate for third order harmonic effects; and processing the reflected magnetic field from the receive coil for determining an angular position of the target.

A method can further include one or more of the following features: the first and second constituent coils of the sine coil are offset from each other by sixty degrees, the respective first and second constituent coils of the sine and cosine coils each comprise butterfly coils, the sine coil further comprises third and fourth constituent coils offset from each other to compensate for fifth order harmonic effects and the cosine coil further comprises third and fourth constituent coils to compensate for fifth order harmonic effects, the respective third and fourth constituent coils of the sine and cosine coils each comprise butterfly coils, an offset for the first, second, third and fourth constituent coils of the sine coil comprises 36 degrees, the sine coil further comprises fifth and sixth constituent coils offset from each other to compensate for seventh order harmonic effects and the cosine coil further comprises fifth and sixth constituent coils to compensate for seventh order harmonic effects, the respective fifth and sixth constituent coils of the sine and cosine coils each comprise butterfly coils, the sensor comprises an angle sensor IC package, the target comprises a cylinder with an end cut at an angle, the third order harmonic effects substantially comprise vertical offset error, and/or the sine and cosine coils are substantially planar.

BRIEF DESCRIPTION OF THE DRAWINGS

The foregoing features of this invention, as well as the invention itself, may be more fully understood from the following description of the drawings in which:

FIG. 5 is a schematic representation of a target and a field reflected by the target in accordance with example embodiments of the disclosure;

FIG. 16a shows constituent coil cosine error, FIG. 16b shows normalized cosine error, and FIG. 16c shows vertical cosine error for the receive coil configuration of FIG. 15a;

FIG. 17a shows constituent coil sine error, FIG. 17b shows normalized sine error, and FIG. 17c shows vertical sine error for the receive coil configuration of FIG. 15a;

FIG. 18a shows vertical cosine error, FIG. 18b shows vertical sine error, and FIG. 18c shows output angle error for the receive coil of FIG. 15a;

DETAILED DESCRIPTION

Figure 1:
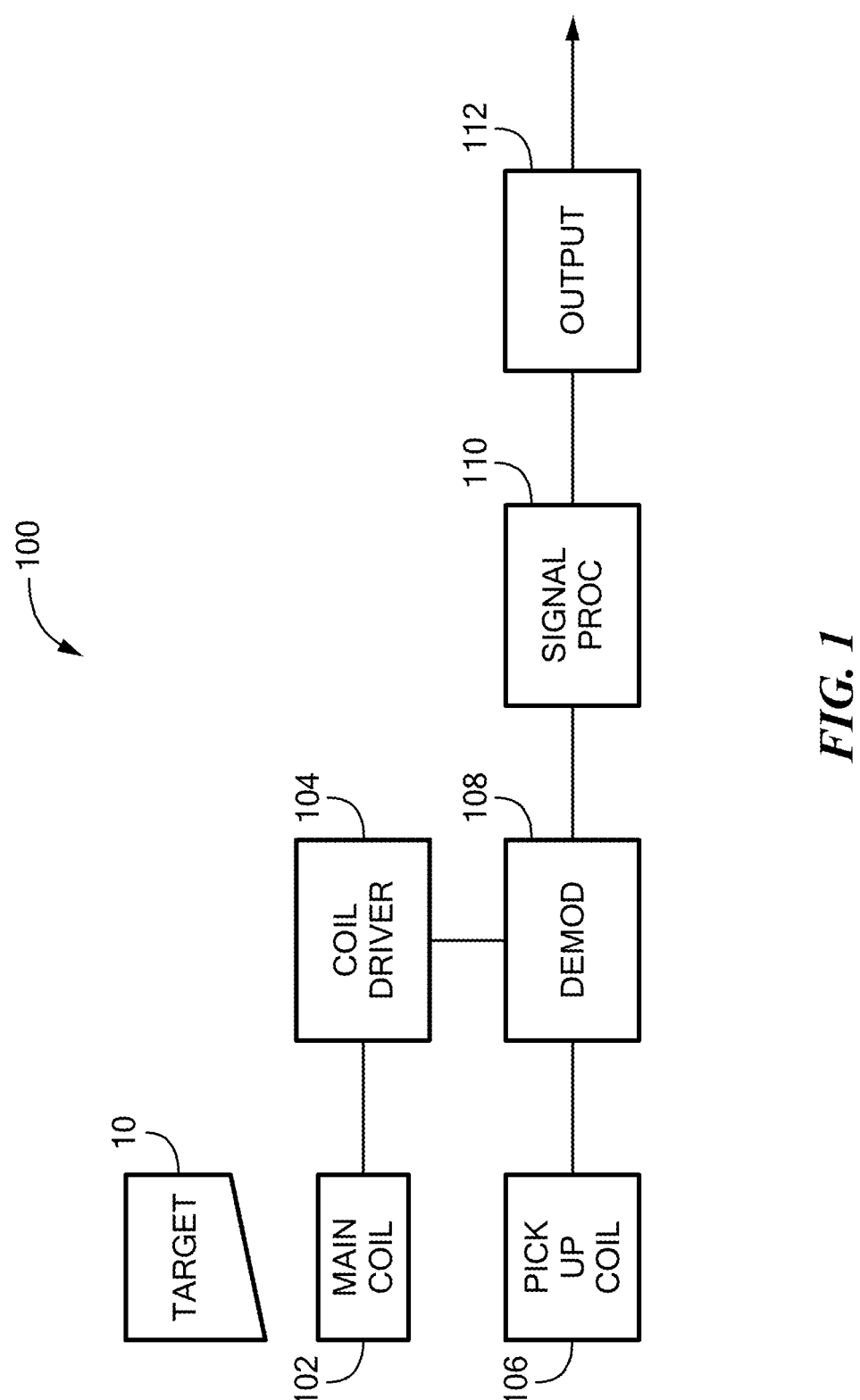
FIG. 1 is a block diagram of an angular position sensor having harmonic compensation in accordance with example embodiments of the disclosure.

FIG. 1 shows an angle sensor system 100 that uses transmit and receive coils and provides harmonic compensation in accordance with example embodiments of the disclosure. The target 10 is located in proximity to the angle sensor to enable determination of angular position. In one embodiment, the target 10 comprises a cylinder with an at least partially conductive end surface proximate the angle sensor 100, and more particularly, a main coil 102. A coil driver module 104 energizes the main/transmit coil 102 with a signal that results in a signal reflected from the target 10. The reflected signal is received by a pick up/receive coil module 106 and demodulated by a demodulator module 108. In embodiments, the pick up coil module 106 includes first and second coils arranged to enable sine and cosine signals to be generated and processed by a signal processing module 110. The signal processing module 110 can determine the angular position of the target 10 so that an output module 112 can output a signal corresponding to angular position of the target 10.

Figure 2:
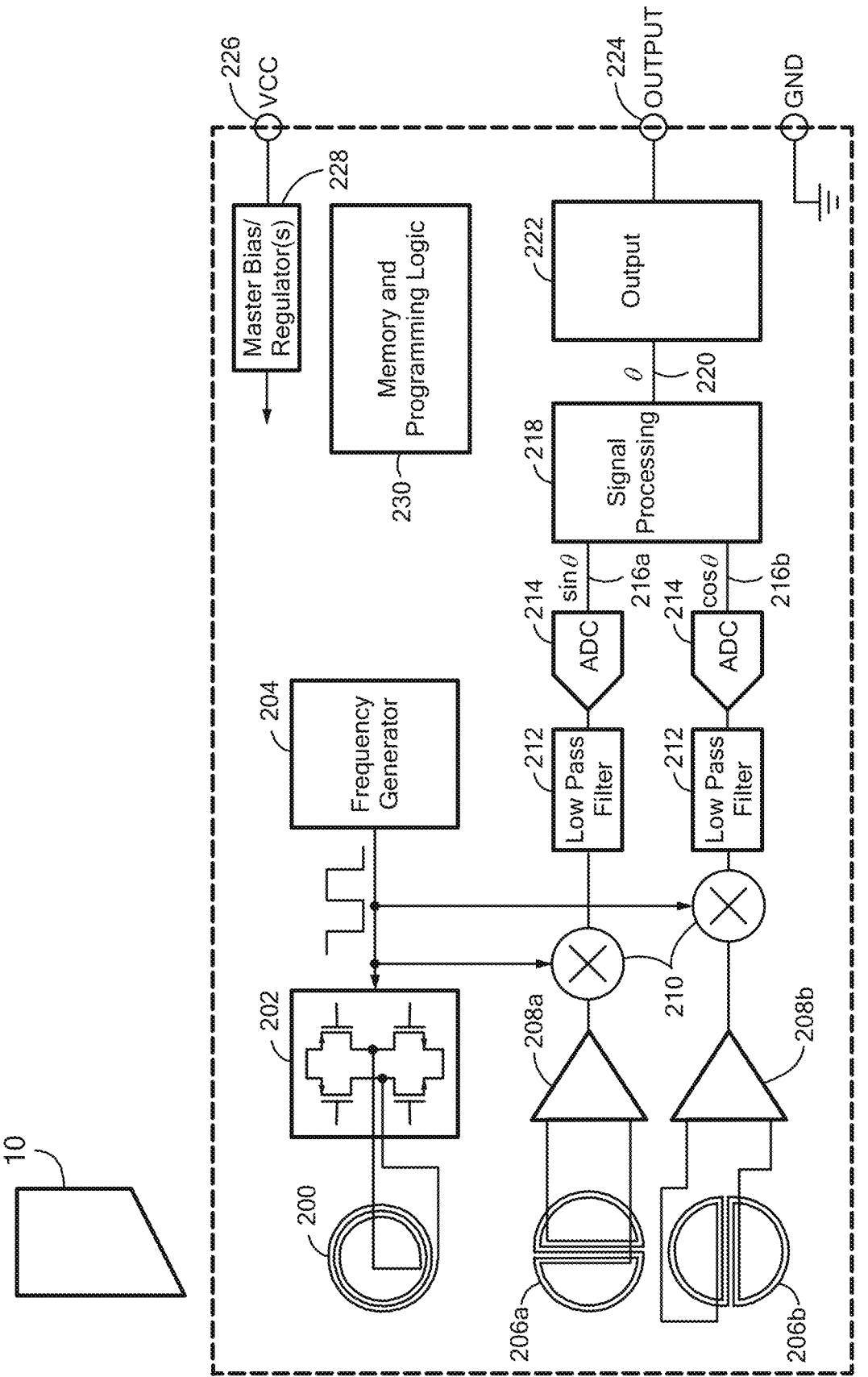
FIG. 2 is a block diagram of an angular position sensor having harmonic compensation in accordance with example embodiments of the disclosure.

FIG. 2 shows additional detail for an integrated circuit (IC) package implementation of the system of FIG. 1. A main coil 200 is driven by a coil driver 202 coupled to a frequency generator 204, for example. In embodiments, coil driver 202 supplies current to the main coil 200 to generate a magnetic field. An alternating current may be used so that the main coil 200 produces alternating magnetic fields (i.e., magnetic fields with magnetic moments that change over time). The field generated by the main coil 200 causes a reflected signal to be generated by the target 10 that is received by first and second pick up coils 206*a,b* and amplified by amplifiers 208*a,b*. In embodiments, the first coil 206*a* is configured to generate a sine signal and the second coil 206*b* is configured to generate a cosine signal. As described more fully below, additional coils can be positioned relation to each other to provide harmonic compensation and reduce residual error. The amplified pick up signals for the first and second coils 206*a,b* are demodulated 210 to bring the high frequency signal down to DC since the magnetic signal will be at the same frequency as that in the main coil, so one uses that same frequency to demodulate down to DC. The sine and cosine signals can be filtered 212, such as with low pass filters 210, and digitized by analog-to-digital converters (ADC) 214.

The digitized sine and cosine signals 216*a,b* are provided to a signal processing module 218 to generate an angular position signal 220 that corresponds to the angular position θ of the target 10. In embodiments, the arc tangent function, e.g., $$\tan^{-1}\frac{\sin\theta}{\cos\theta},$$

can be used to determine angular position θ. In some embodiments, angular position processing is performed in the digital domain. In other embodiments, angular position processing is performed in the analog domain. The angular position signal can be received by an output module 222. In embodiments, the output module can perform signal linearization, calibration, and the like, of the position signal prior to output from the IC, for example, on an output pin 224.

The IC can include an IO pin 226 configured to receive a voltage supply signal VCC. A regulator module 228 can provide voltage signals throughout the IC and provide master bias and other functionality. The IC can further include memory 230 to store programming logic, provide volatile and/or non-volatile memory, and the like.

Figure 3:
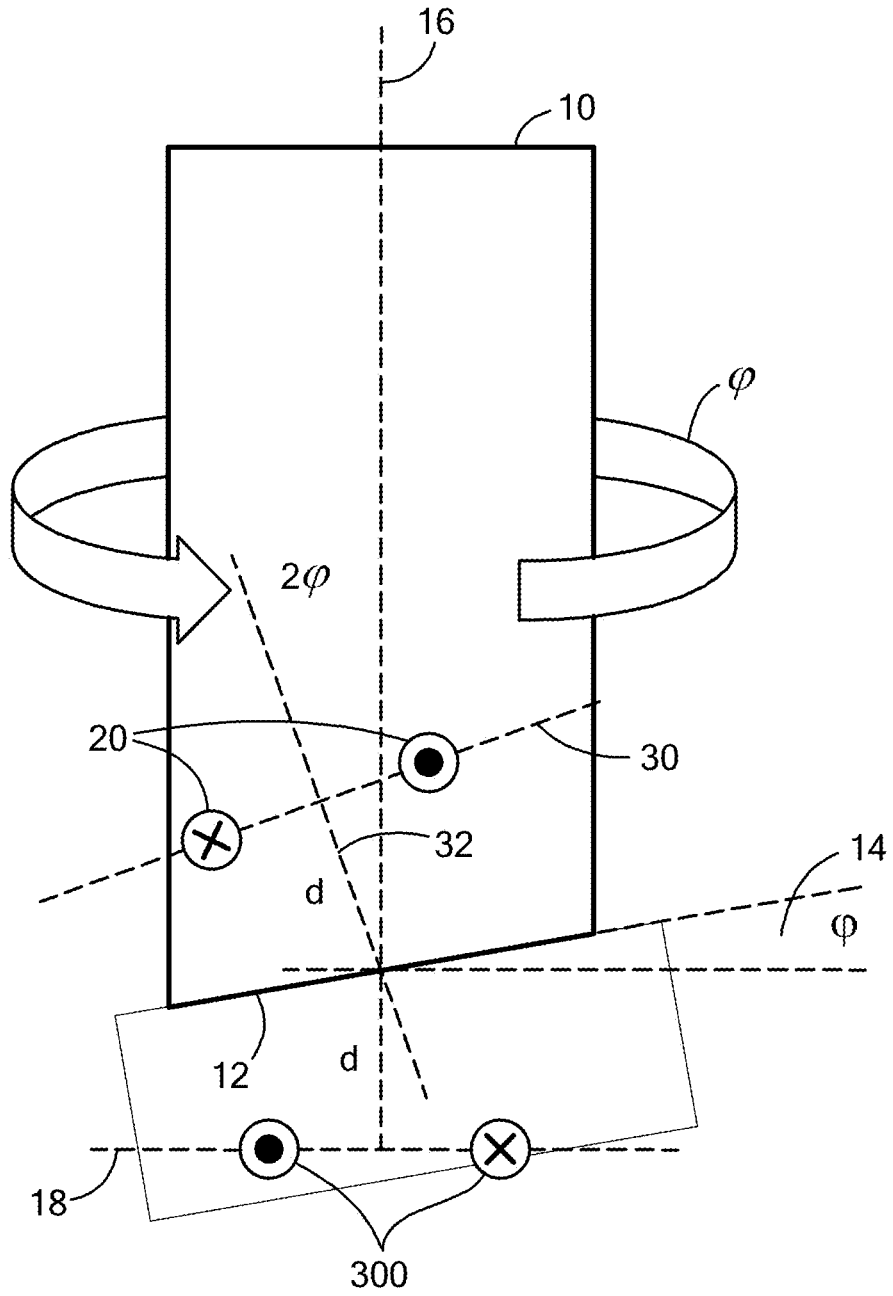
FIG. 3 is a schematic representation of a target having a cut end that is conductive for which angular position can be sensed in accordance with example embodiments of the disclosure.

In example embodiments, the main coil 200 is energized with a signal having a frequency in the range of about 1 to about 20 MHz. It is understood that other frequencies can be used to meet the needs of a particular application, and going to higher frequency can increase signal strength FIG. 3 shows an example target 10 in the form of a cylinder having at an end 12 that is cut at an angle 14 shown as q. In one embodiment, the angle 14 is defined in relation to a longitudinal axis 16 of the cylinder that is perpendicular to a plane/axis 18 in which the main coil 300 resides. The cut end 12 of the target is at least partially conductive. In some embodiments, at least the end 12 of the target is formed from a conductive material, such as aluminum. In some embodiments, a conductive material can be applied to the end 12 of the target, which may be formed from a conductive or non-conductive material. The cylinder 10 rotates about its longitudinal axis 16 with an angular position defined by θ while the main coil 300 radiates a magnetic field toward the end 12 of the cylinder. A mirrored coil 20 is shown at a distance from the end 12 of the target at a given location. It is understood that the mirrored coil is an idealized model, which assumes a perfect conductor and vacuum, that can be used to model the reflected field from the conductive target end. It is understood that an X in a circle indicates a current into the paper and a dot in a circle indicates a current coming out of the paper. An example range for the cut angle is about +/−45 degrees. In many embodiments, the cut angle is between about 5 and 15 degrees.

The end 12 of the target, at the axis 16 of the target, is located a distance d from the plane 18 of the main coil 300. The mirror coil 20 is located in a plane 30 that is bisected by a segment 32 extending perpendicularly from the mirror coil plane 30 such that an angle formed by segment 32 and the target longitudinal axis 16 is 2φ. The segment 32 extends a distance d from the end 12 of the target at the axis 16 to the plane 30 of the mirror coil 20.

As noted above, the main coil 300 causes a reflected field to emanate from the target 10. The reflected field can be modeled as the mirror coil 20. Pick up coils, as described above and below, can receive the reflected field and generate an angular position signal for the target 10.

In accordance with Maxwell's equations, the magnetic field from the main coil 300 induces Eddy currents in the conductive surface 12 of the target. In addition, an ideal conductor keeps AC magnetic flux lines from crossing its boundary which results in symmetry of the main and mirrored coil across the boundary of the conductor.

Figure 4:
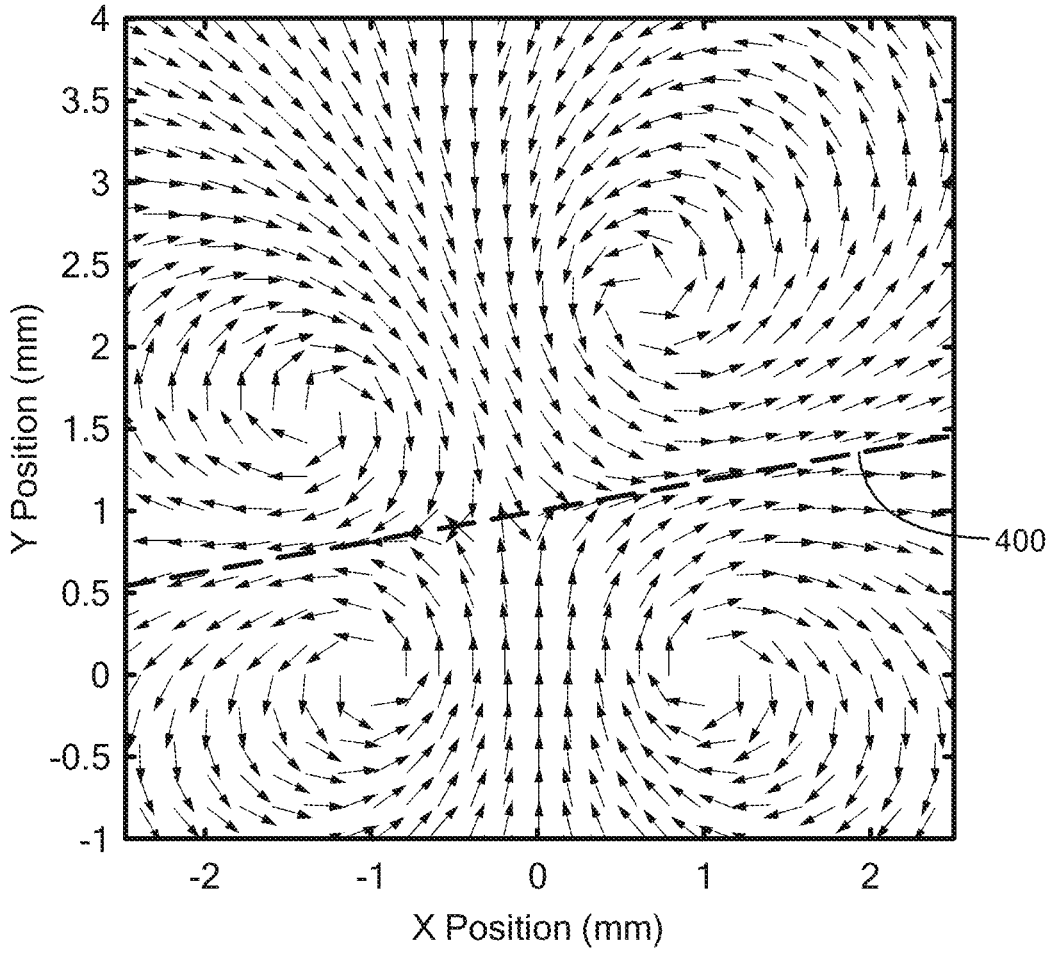
FIG. 4 is a graphical representation of the magnetic fields created when eddy currents are generated in a cut end surface of the target of FIG. 3 that can be used to determine an angle or rotation of the cut for the target in accordance with example embodiments of the disclosure.

FIG. 4 shows the combined field lines from a main coil and from a 'mirrored coil', which is located according to FIG. 3. The resulting fields never cross the target boundary 400. In operation, the main coil 300 applies a field on the target 10 that causes eddy currents to flow within the target. These eddy currents create their own magnetic fields that can be modeled as the mirror coil 20. In practice, currents will only flow on the surface of the target, but the effect will be as if the currents were flowing like mirror coil 20. It should be noted that Faraday's Law says that the voltage induced in a closed loop is proportional to the rate of change of the magnetic flux that the loop encloses. This means that an AC magnetic field crossing a sheet induces a voltage in the sheet. However, a perfect conductor cannot have a voltage induced on it, so, instead, currents develop on the surface to reject the magnetic field from going through the conductor. This is what one will see in a finite element simulation. However, one can model this behavior through symmetry. Basically, there is no field crossing the boundary by having symmetric coils (same size and current) across the boundary as shown in FIG. 3. That is not where the actual currents flow, as there is no magnetic field inside the conductor, but rather models the magnetic fields external to the conductor as if those surface currents were flowing. That means that in FIG. 4, the fields below the dashed line 400 are the ones actually seen, and the ones above it will not exist in reality.

It will be appreciated that the cut angle provides an optimization. As one increases the cut angle, the angle of the reflected field increases, thereby increasing the differential seen by the pick-up coils, but one also has to increase distance d in order to keep the edge of the target from hitting the sensor, which reduces the field seen. In example embodiments, around 7.5 degrees provides the largest output signal for a 1 mm air-gap from the lowest point of the target to the sensor.

Figure 5:
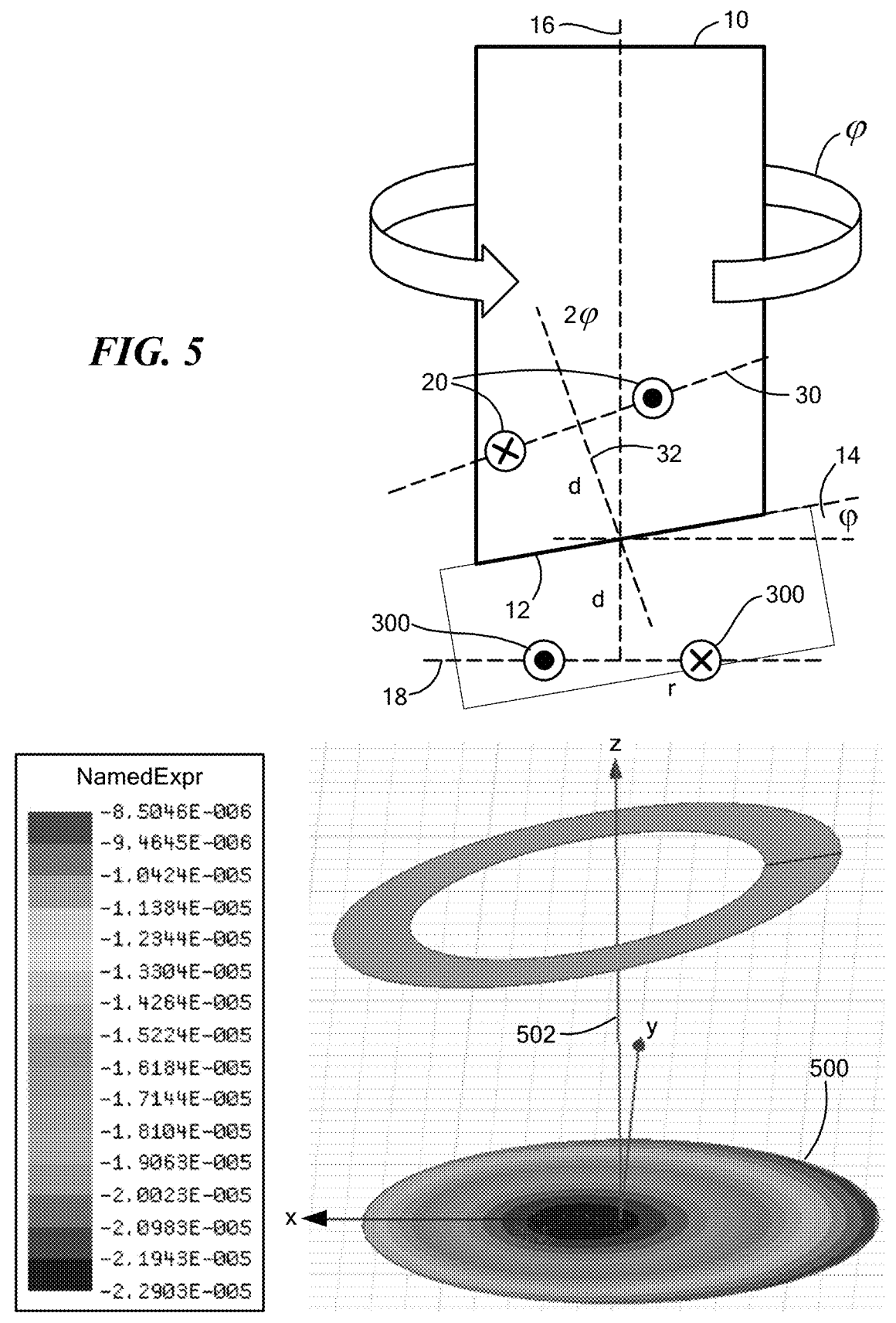
Figure 5A:
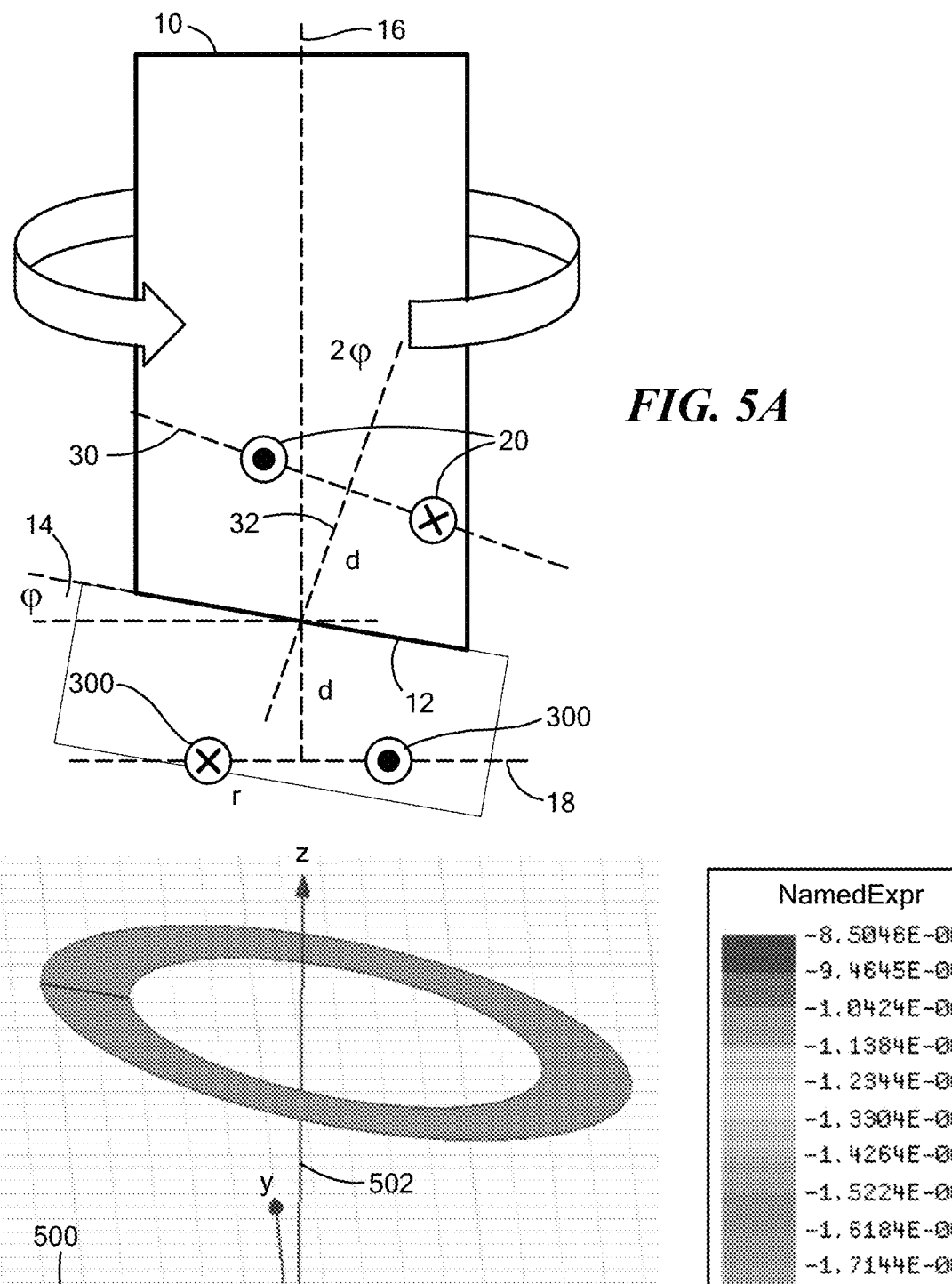
FIG. 5A is a schematic representation of a target and a field reflected by the target that is rotated from its position in FIG. 5 in accordance with example embodiments of the disclosure.

FIG. 5 shows a rotating target 10 subjected to a field from the main coil 300 generating a reflected signal 500 shown below the target. As can be seen, in the plane 18 of the main coil 300 the reflected signal from the mirror coil model is not symmetric. The asymmetric signal rotates about a rotation axis 502, which can correspond the target longitudinal axis 16, as the target 10 rotates. This asymmetric signal rotation can be detected by pickup coils. FIG. 5A shows the target rotated about 180 degrees and corresponding field.

The reflected signal 500 is generated from an example modelled system in which d=1 mm, θ=5°, r=1.5 mm (radius of main coil), where the main coil has outer radius of 1.5 mm and an inner radius of 1.05 mm. The current to the main coil 300 is 300 mA-turns. It is understood that only the mirrored coil is modelled in the illustrated embodiment. In embodiments, the main coil 300 field is substantially cancelled by differential pick up coils.

The reflected field is plotted as B in the z-direction, which is what the pick up coils detect. As can be seen, the strongest field level is off center towards the closer piece of the cylinder 10. The reflected field rotates with the cylinder/ target 10. With an offset reflected field, pick up coils centered on the main coil 300 will detect the off-center field.

It is understood that various types and arrangements of pick up coils can be used to meet the needs of a particular application. Coils can be circular, ovular, square, polygonal, and the like, and can have any practical width and thickness.

It is understood that the mutual inductance between the main and pickup coils changes as the target rotates. The mutual inductance is proportional to the sum of the fields directly produced by the main coil and reflected from the target, which the pick-up coils encompass. It is desirable to have low mutual inductance between the main coil and the pickup coils due to the direct field to enable sensing of the reflected field in the presence of the field generated by the main coil. Mutual inductance due to the direct field creates an offset that is constant over angle (theta), which can be large due to the close proximity of the coils, making it challenging to detect the small change in mutual inductance due to the reflected field changing over angle (theta). Where each of the pick-up coils encompass a total of near zero field from the main coil (note that encompassing field clockwise adds to the total and counterclockwise subtracts from the total), the mutual inductance due to the direct field will approach zero. That is, the pick-up coils are configured such that the net field from the main coil on the pick-up coils is substantially zero.

In embodiments, first and second sets of differential pick up coils detect the field from the mirrored coil. Differential coils may cancel out the direct field from the main coil. In one embodiment, first and second sets of coils are 90 degrees out of phase to yield sine and cosine outputs on which an arctangent can be used. Using sine and cosine signals may enhance immunity to system variations, e.g., airgap, temperature, frequency etc., as well as stray field immunity. In addition, DC fields will not be picked up by the coils, while uniform AC fields may be rejected by the differential coils.

Figures 6A, 6B, 6C, 6D:
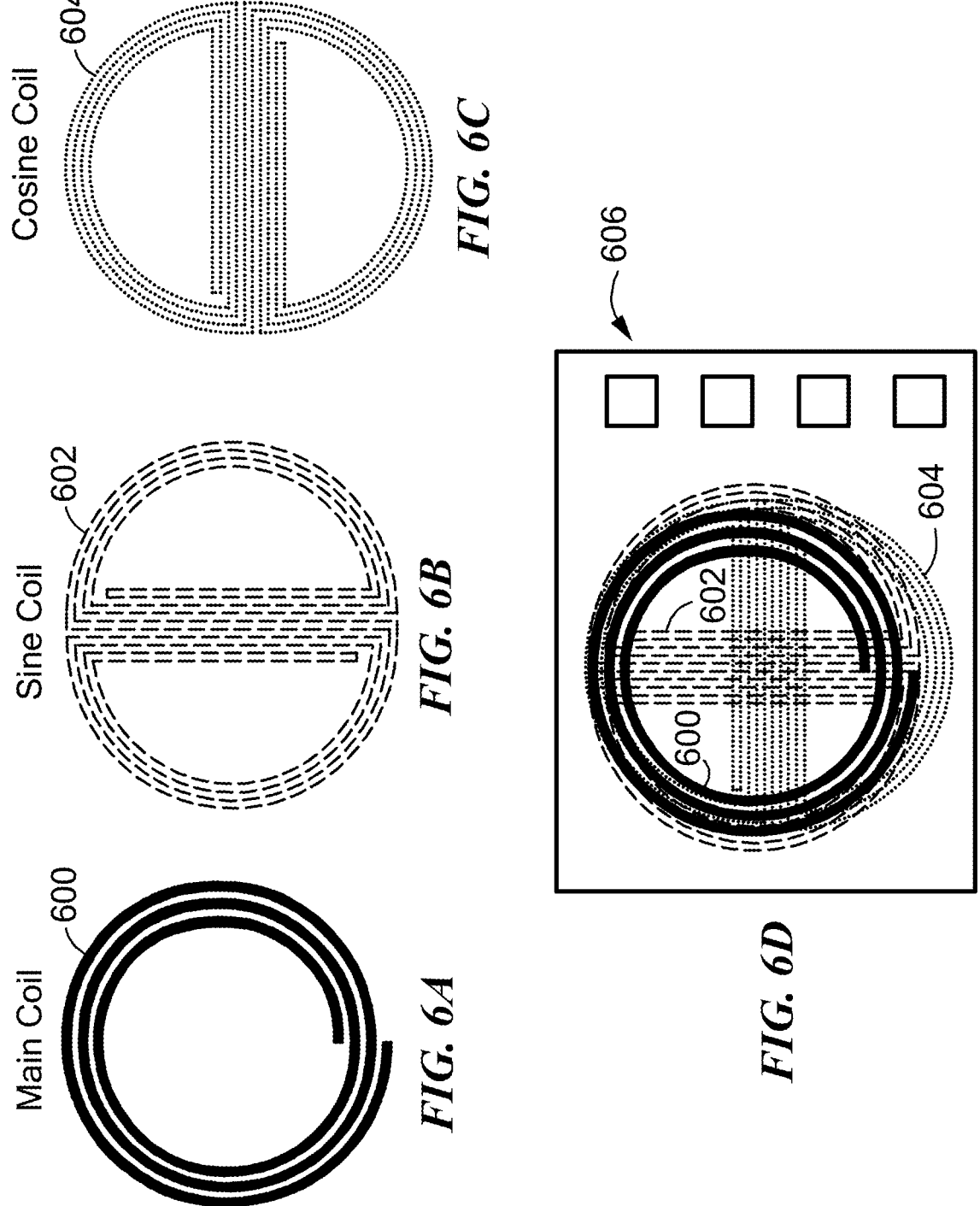
FIG. 6A is an example implementation of a main coil that can form at part of an angular position sensor using eddy currents in accordance with example embodiments of the invention.
FIG. 6B is an example implementation of a first pick up coil that can form at part of an angular position sensor using eddy currents in accordance with example embodiments of the invention.
FIG. 6C is an example implementation of a second coil that can form at part of an angular position sensor using eddy currents in accordance with example embodiments of the invention.
FIG. 6D is a schematic representation of an example configuration for the main coil of FIG. 6A, the first pick up coil of FIG. 6B, and the second pick up coil of FIG. 6C.

FIG. 6A shows an example configuration for a main coil 600, FIG. 6B shows an example configuration for a sine coil 602, and FIG. 6C shows an example configuration for a cosine coil 604. FIG. 6D shows an example embodiment of a stacked arrangement 606 in which the main coil 600, cosine coil 604, and sine coil 602 overlap each other, wherein each coil has about the same radius. An example angle sensor having transit and receive coils is shown in U.S. Pat. No. 11,112,230, which is incorporated herein by reference.

Figures 7, 7A:
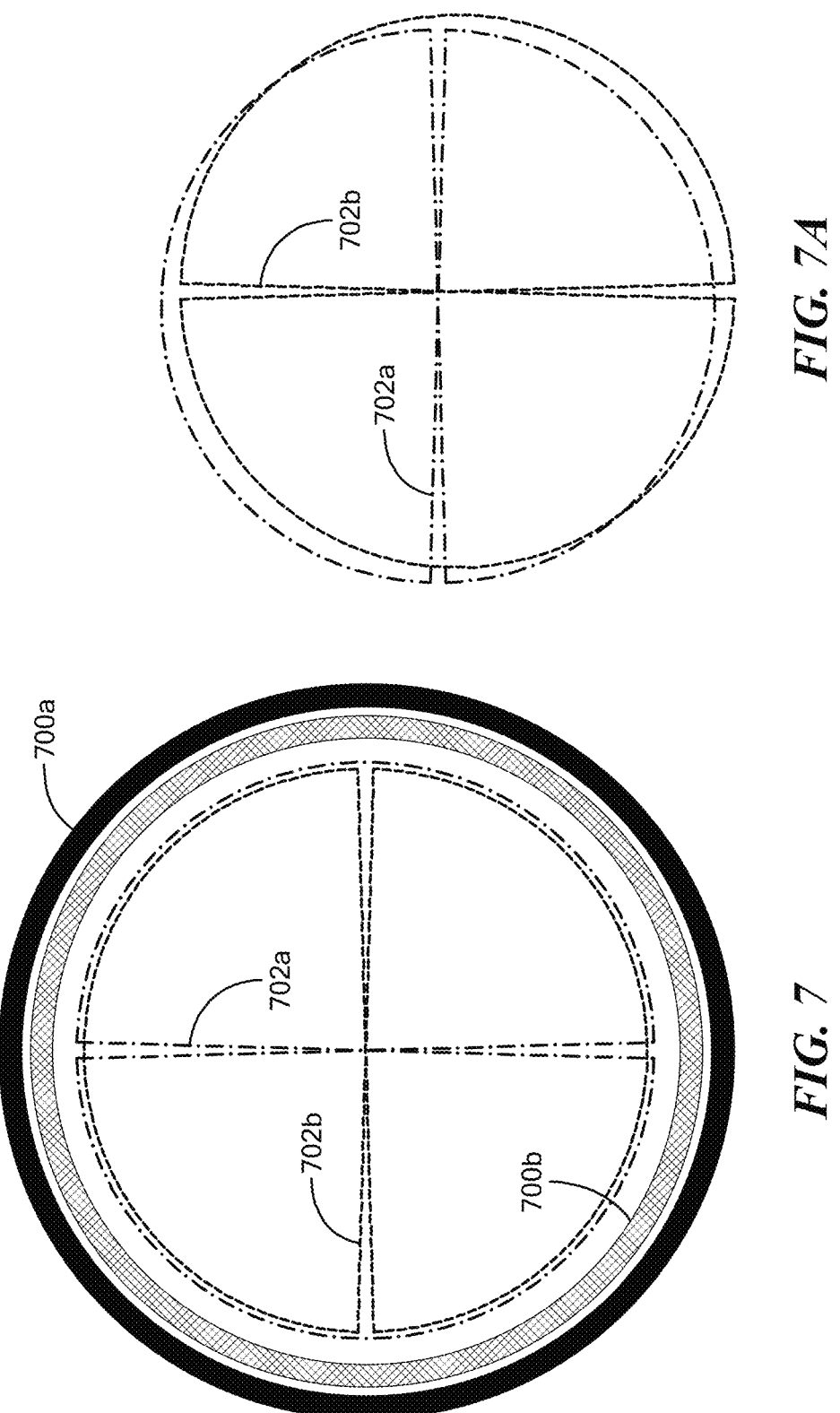
FIG. 7 is a top view of example transmit and receive coils.
FIG. 7A is a top view showing the receive coils of FIG. 7.

FIG. 7 shows example transmit coils 700a,b and receive coils 702a,b. FIG. 7A shows the receive coils 702a,b offset from each other slightly in order that may be seen separately. As can be seen, in an example embodiment, the receive coils 702a,b are formed from a circular shape with a twist along the diameter to form a shape that can be referred as a butterfly coil. The direction of the twist is used to obtain a sine signal and a cosine signal by enforcing perpendicularity between the respective twists.

Figures 8A, 8B, 8C:
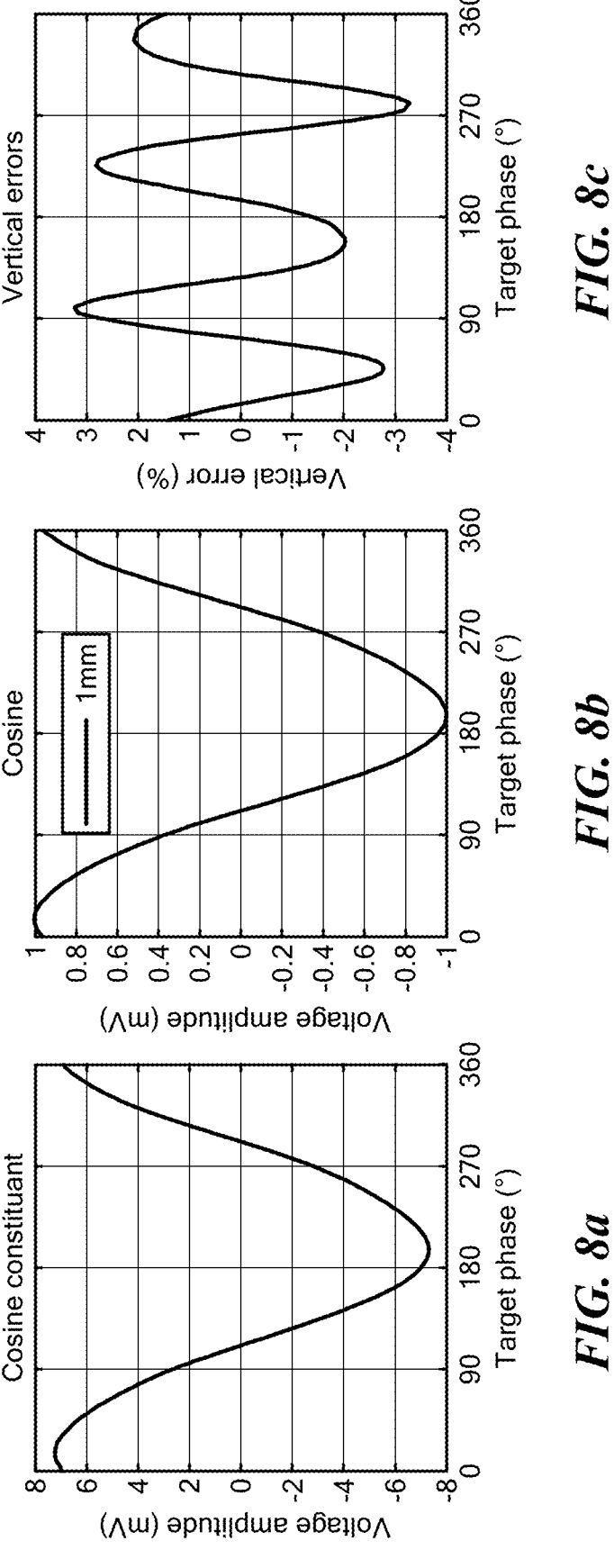
FIG. 8a shows constituent cosine coil signals.
FIG. 8b shows normalized cosine signals.
FIG. 8c shows vertical error in cosine for the configuration of FIG. 7.
Figures 9A, 9B, 9C:
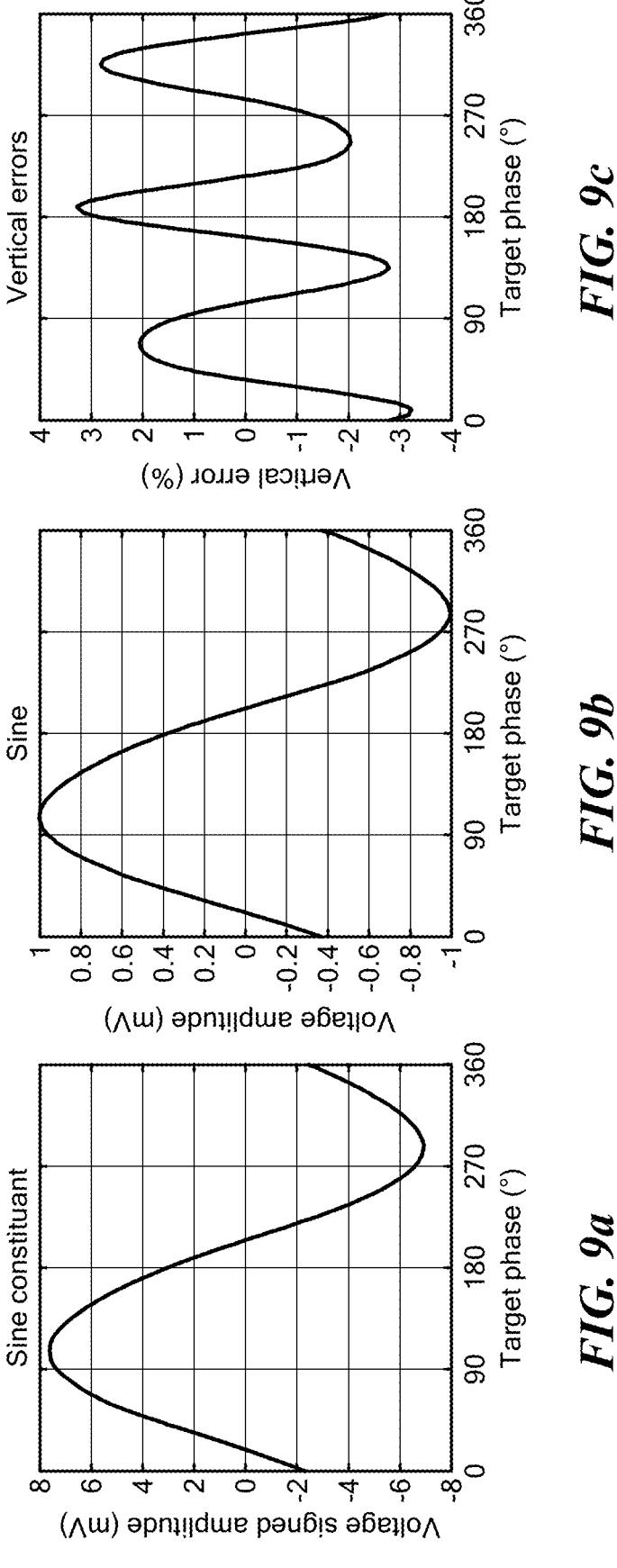
FIG. 9a shows constituent sine coil signals.
FIG. 9b shows normalized sine signals.
FIG. 9c shows vertical error in sine for the configuration of FIG. 7.

FIG. 8a shows a cosine signal from the receive coils 702b, FIG. 8b shows a normalized cosine signal, and FIG. 8c shows vertical error versus target phase. Similarly, FIG. 9a shows a sine signal from the receive coils 702a, FIG. 9b shows a normalized sine signal, and FIG. 9c shows vertical error versus target phase. FIGS. 8a and 9a represent the output voltage of the sine and cosine coils (for a drive current of 100 mA, a drive frequency of 3.5 MHz and a 1 mm air gap). The vertical error is defined as follows: if the signal has an amplitude A, a phase P and an offset O, the vertical error is defined as:

$$Err_{Vertical} = \frac{\text{Signal} - [A \cos(\theta - P) + O]}{A}$$

Figures 10A, 10B:
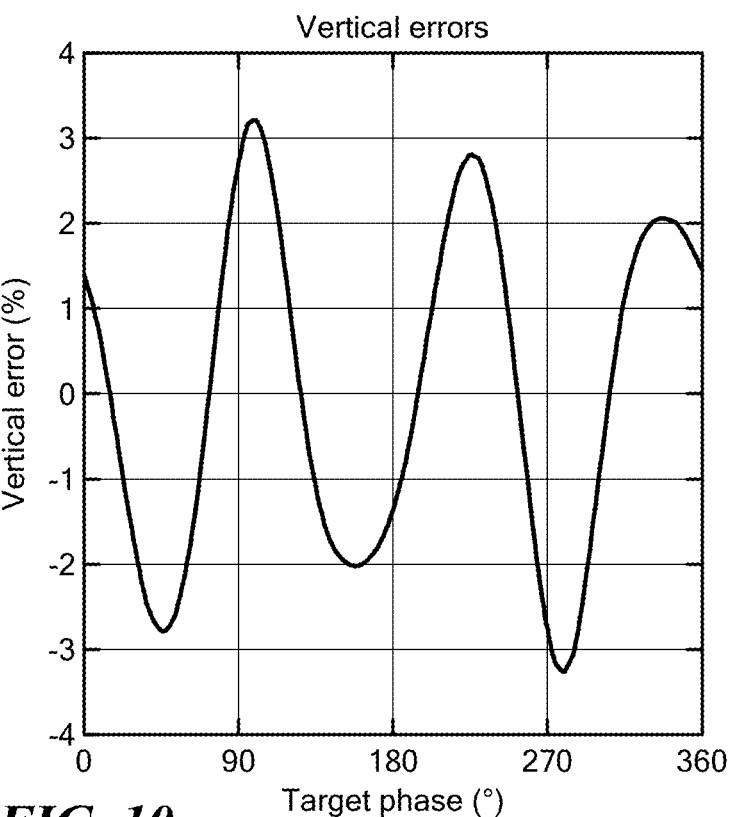
FIG. 10a shows vertical cosine error and FIG. 10b shows vertical sine error for a single coil per channel.
Figure 10C:
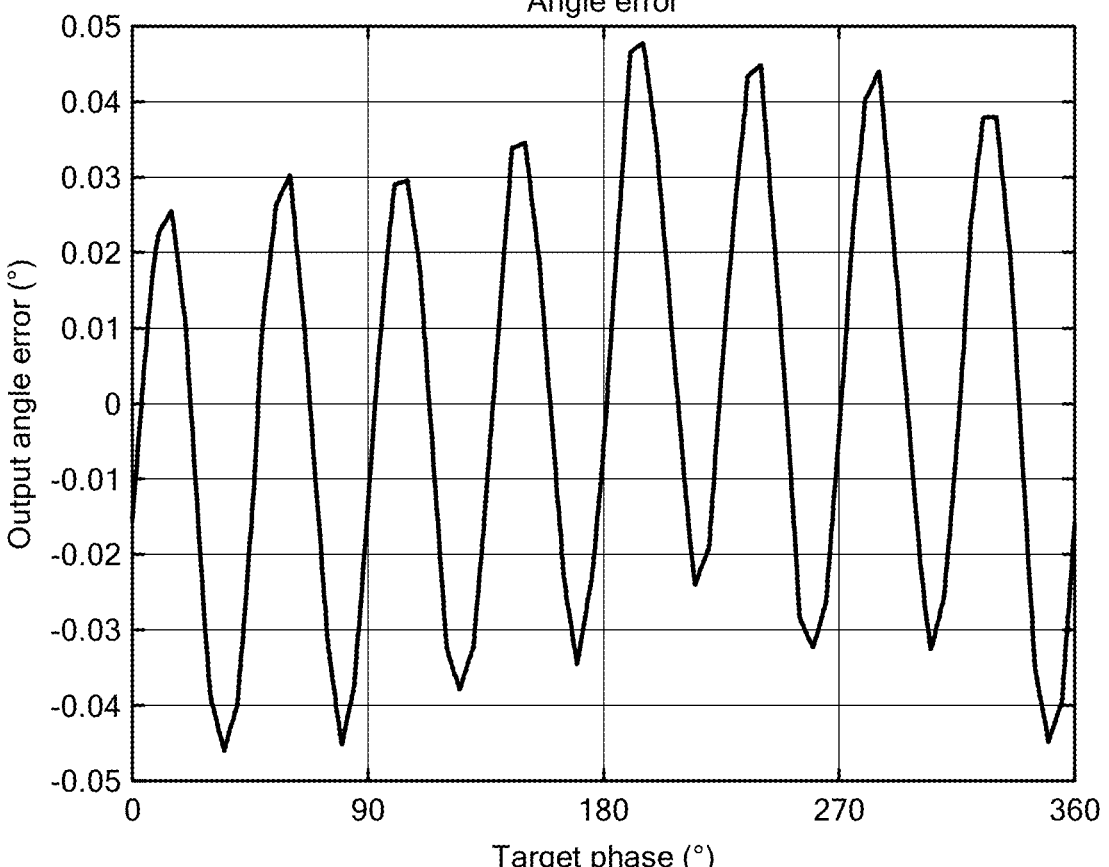
FIG. 10c shows output angle error for the configuration of FIG. 7.

FIG. 10a shows vertical error for cosine, FIG. 10b shows vertical error for sine, and FIG. 10c shows output angle error for the coil configuration of FIG. 7.

However, if one wants to reduce the angle error at the transducer level, the main source of errors in the signal paths can be characterized in a way other than the output angle error. As can be seen, this error is an interference pattern of the vertical errors of both channels, as shown in FIG. 10c. The vertical error is third harmonic on sine and cosine, but the fourth harmonic on the angle error. Because the residual vertical error is due to third order harmonic effects, the vertical error can be reduced by adding a second constituent coil tilted/offset by 60° (180°/3) from the first coil.

FIGS. 11A-D show a receive coil 1100 configured to compensate for third order harmonic vertical error in the sine and cosine channels of the transducer. In the illustrated embodiment, each of first and second signal paths comprises first and second butterfly coils-one coil is tilted at minus 30° from the original single coil configuration and the other coil tilted plus 30° for total of 60 degree offset/tilt (see FIGS. 11C and 11D). It is understood that the paired butterfly coils are connected in series.

Figure 11A:
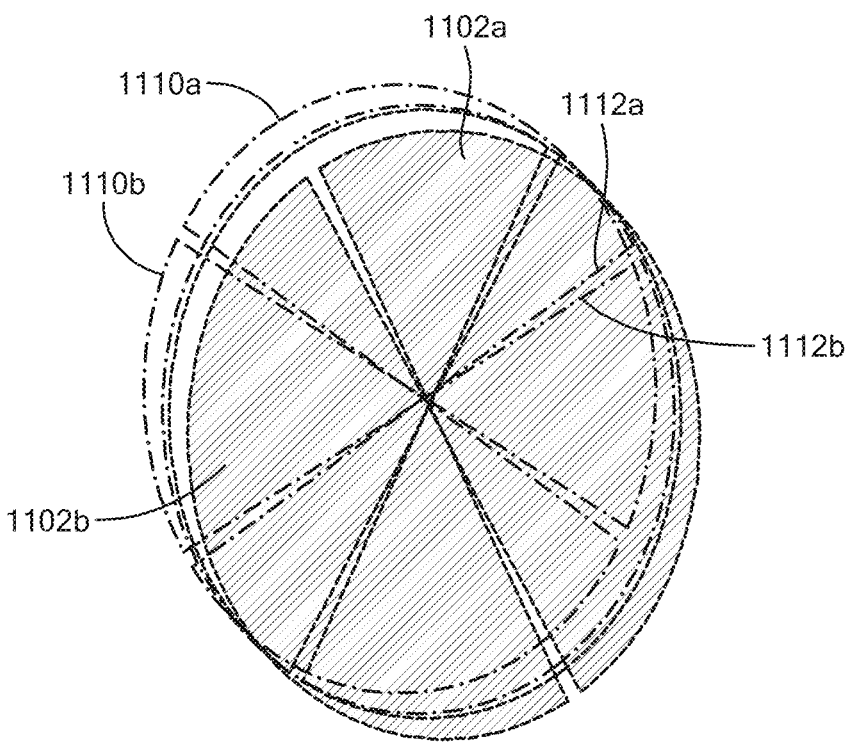
FIG. 11A shows an example receive coil configured to provide third harmonic compensation with a first pair of coil loops emphasized.
Figure 11B:
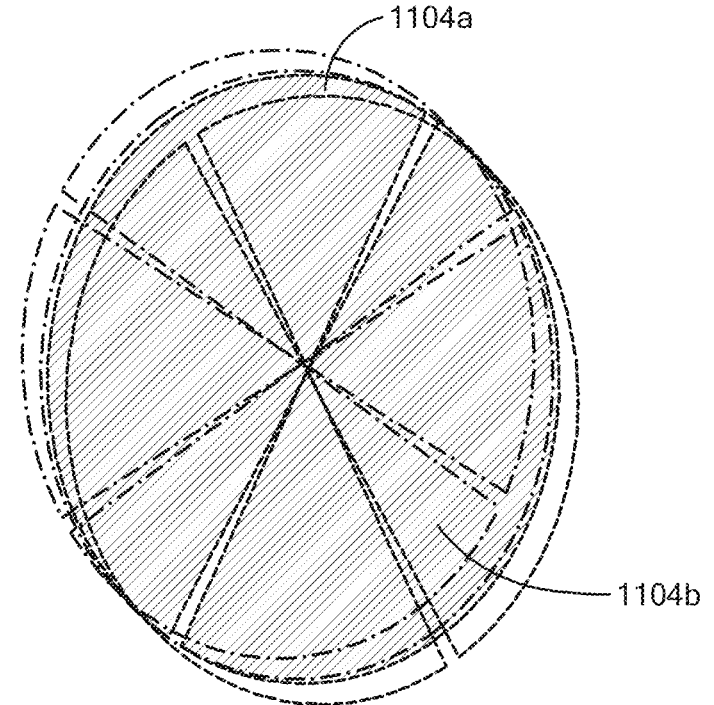
FIG. 11B shows a second pair of receive coil loops emphasized.
Figure 11C:
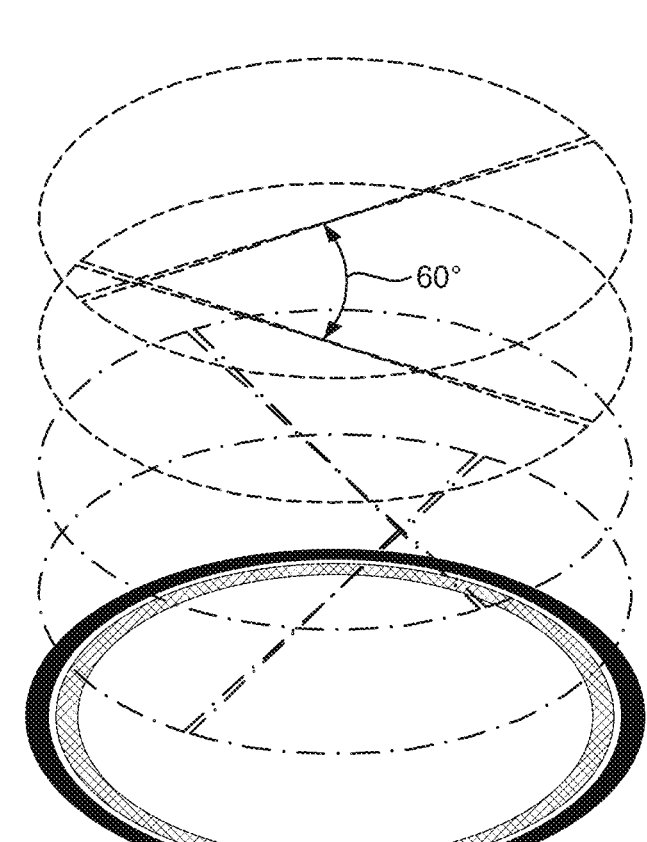
FIG. 11C shows an exploded view of the example receive coil configuration and an example transmit coil.
Figure 11D:
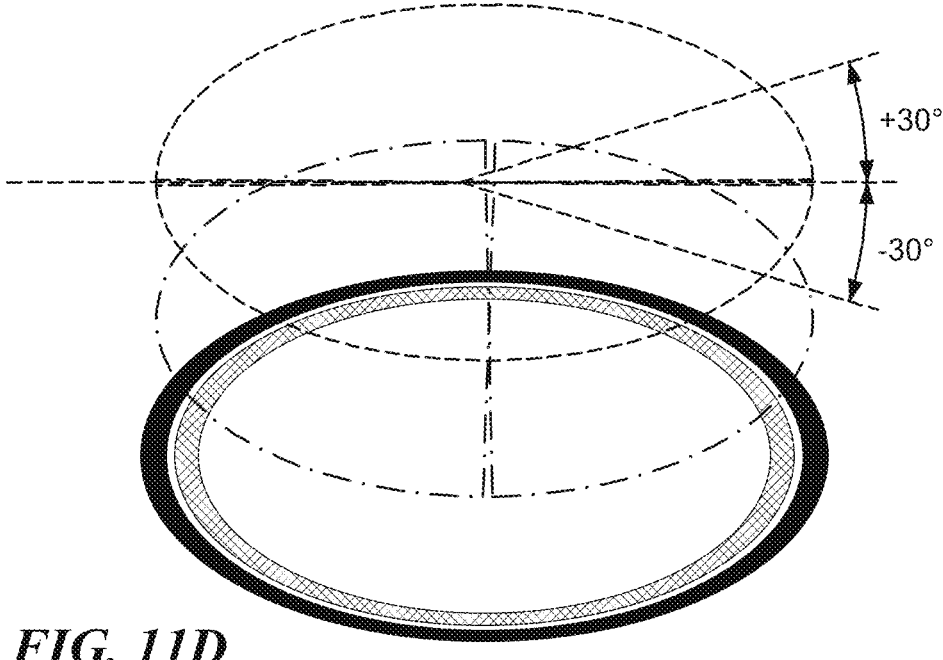
FIG. 11D shows coils offset at +/− thirty degrees for a total of 60 degree offset for third harmonic compensation.

As best seen in FIG. 11A, in the illustrated embodiment, a first signal path, which may correspond to cosine, includes a first butterfly coil 1102 having first and second "wings 1102a,b and a second butterfly coil 1104 having third and fourth "wings" 1104a,b, as best seen in FIG. 11B. It is understood that the hatching is intended to more easily identify the butterfly coils and is not intended to limit the scope of the claims in any way. FIG. 11C shows the butterfly coils in an exploded view with the transmit coil at the bottom.

A second signal path, which can correspond to sine, can include a first butterfly coil 1110 with wings 1110a,b offset from a second butterfly coil 1112 with wings 1112a,b for third order harmonic compensation.

Figure 11E:
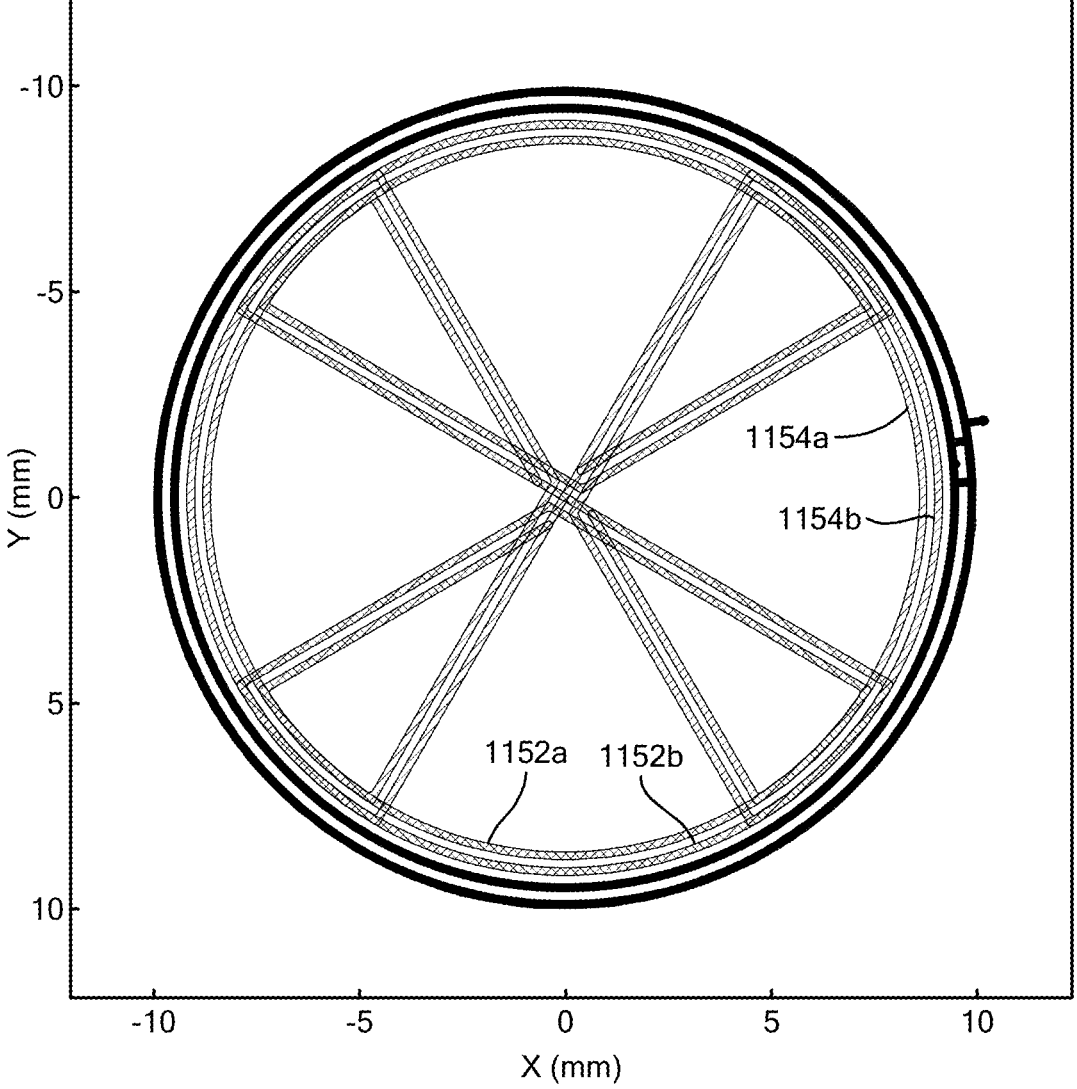
FIG. 11E shows a coil configuration in a PCB layer.
Figures 11F, 11G:
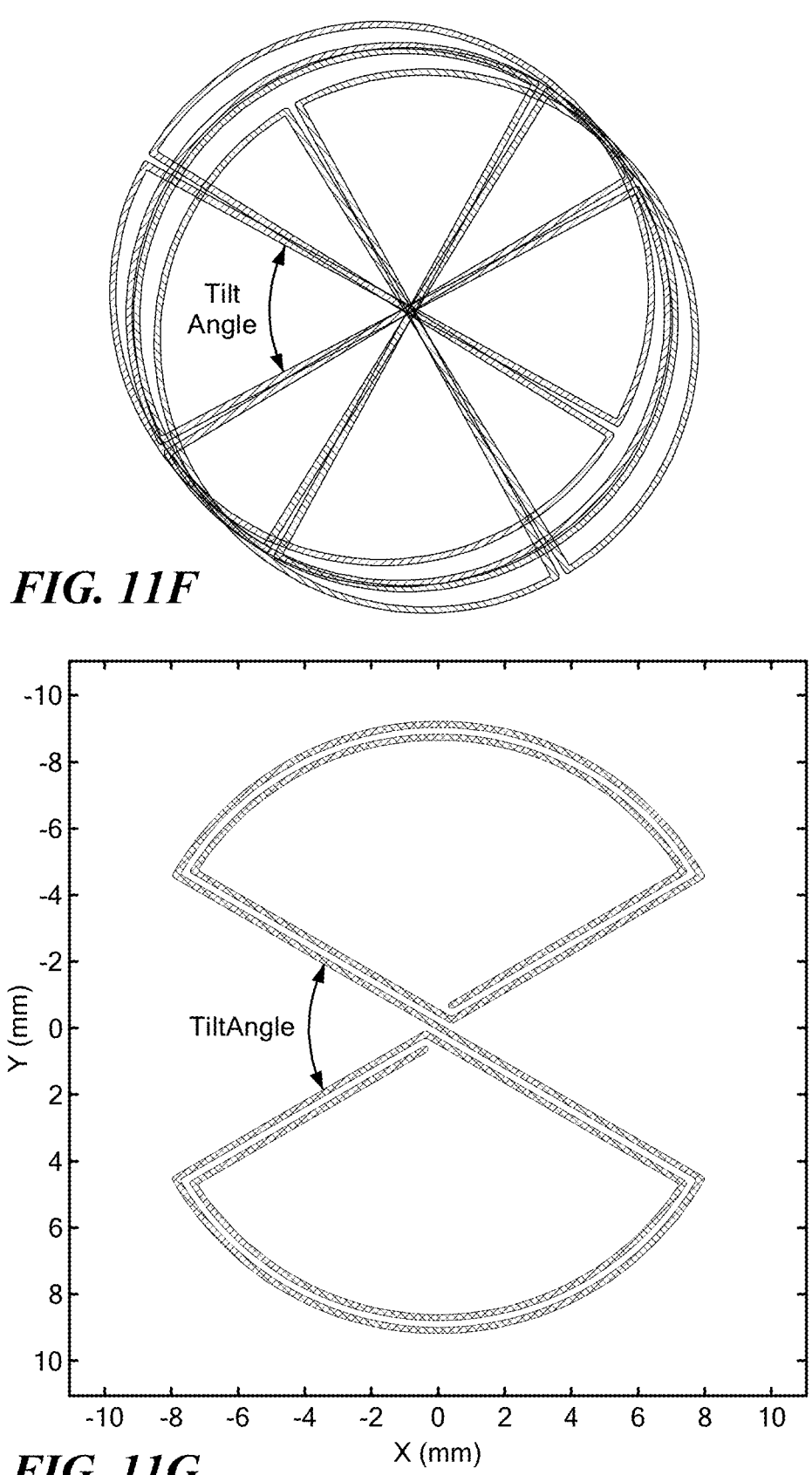
FIG. 11F shows a coil configuration with an example tilt angle and FIGS. 11G and 11H show the respective butterfly coils separately.
Figure 11H:
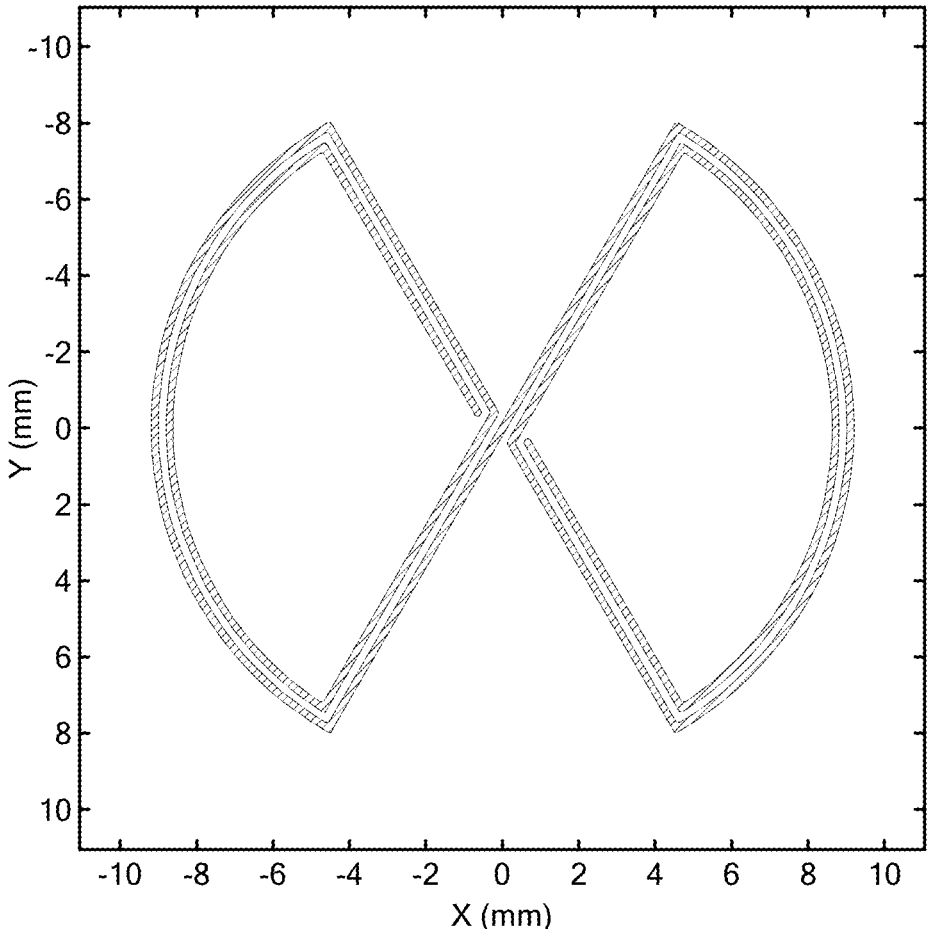

In some embodiments, the butterfly coils can stand on respective printed circuit board (PCB) layer. FIG. 11E shows the coils of FIG. 11B simplified. The first and second wings 1102a,b of FIG. 11A correspond to wings 1152a,b in FIG. 11E and the third and fourth wings 1104a,b correspond to wings 1154a,b. FIG. 11F shows an example tilt angle indicated and FIGS. 11G and 11H shows the respective butterfly coils separately. In this coil configuration, the tilt angle is the same.

The first and second butterfly coils 1102a,b of FIG. 11A are equivalent to the coils in FIG. 11H. The first and second butterfly coils 1110*a,b* of FIG. 11A are equivalent to the coils in FIG. 11G. It is understood that there are two turns in the coils shown in FIGS. 11H and 11G because they are made from two butterfly coils.

Figures 12A, 12B, 12C:
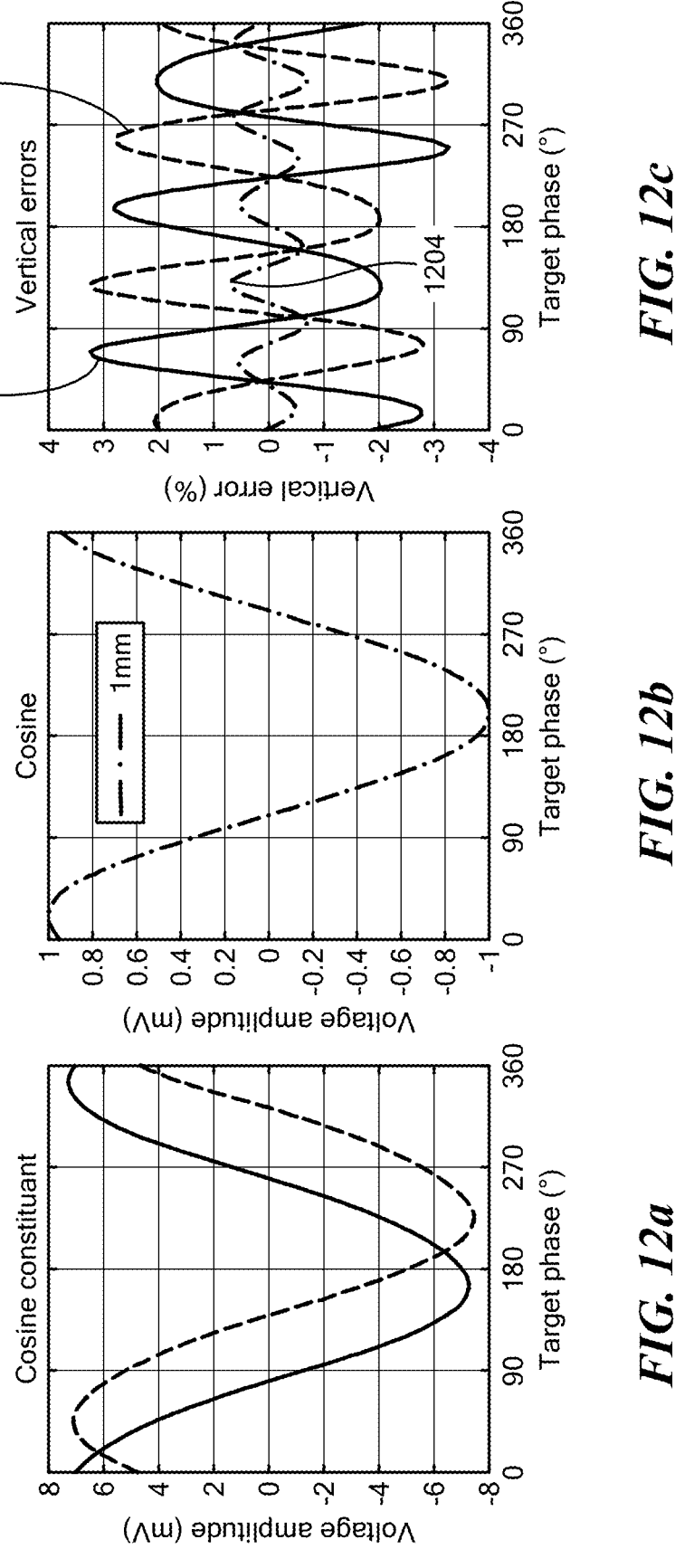
FIG. 12a shows constituent coil cosine error and FIG. 12b shows normalized cosine error.
FIG. 12c shows vertical cosine error for the receive coil configuration of FIG. 11A.
Figures 13A, 13B, 13C:
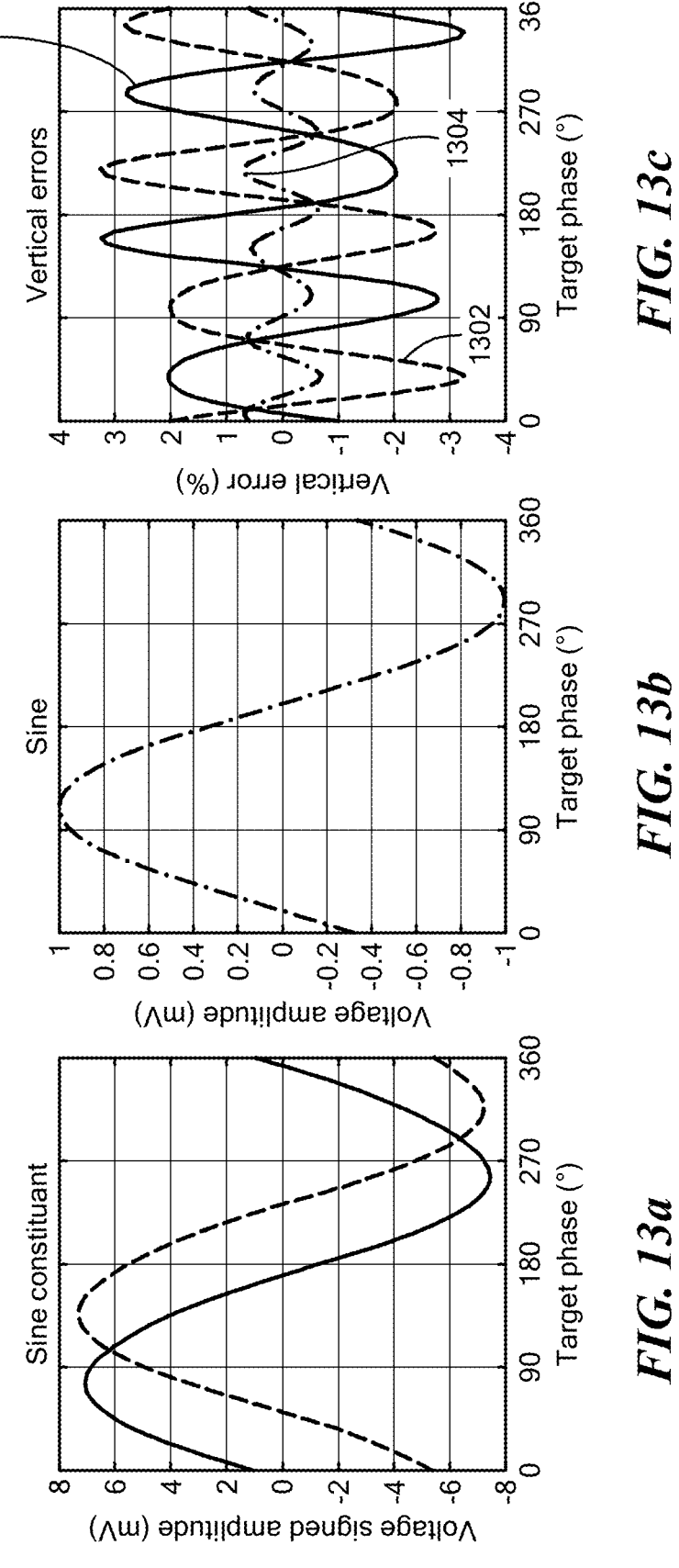
FIG. 13a shows constituent coil sine error and FIG. 13b shows normalized sine error.
FIG. 13c shows vertical sine error for the receive coil configuration of FIG. 11A.

FIGS. 12*a-c* and 13*a-c* show respective cosine (from coils 1110*a,b* and 1112*a,b*) and sine (from coils 1102*a,b* and 1104*a,b*) constituent signals, normalized cosine and sine signals, and cosine and sine vertical error in percentage of each signal's amplitude. FIGS. 12*a* and 13*a* show the signal of the constituent coils (individual loops) of the sine and cosine signals. FIGS. 12*b* and 13*b* show the sum of the constituent coils normalized. FIGS. 12*c* and 13*c* show the vertical errors for the constituent coils 1200, 1202, 1300, 1302 and for the full sine and cosine signals 1204, 1304. Each constituent coil has a vertical error of about 3.2% due mainly to third harmonic effects. As can be seen, the vertical error is reduced from 3.2% to 0.7% with third order harmonic compensation. It is understood that a significant component of the 0.7% error may be due to fifth harmonics.

Figures 14A, 14B, 14C:
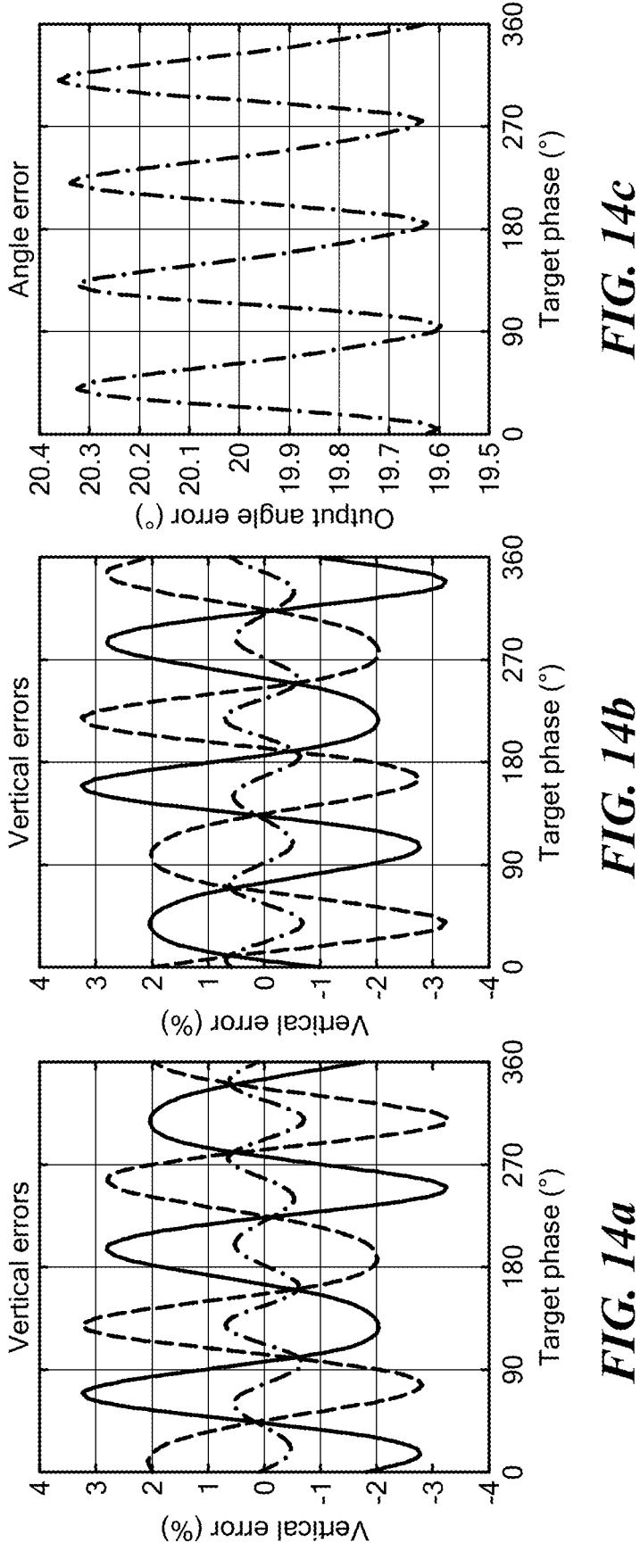
FIG. 14a shows vertical cosine error.
FIG. 14b shows vertical sine error and FIG. 14c shows output angle error for the receive coil configuration of FIG. 11A.
Figure 15A:
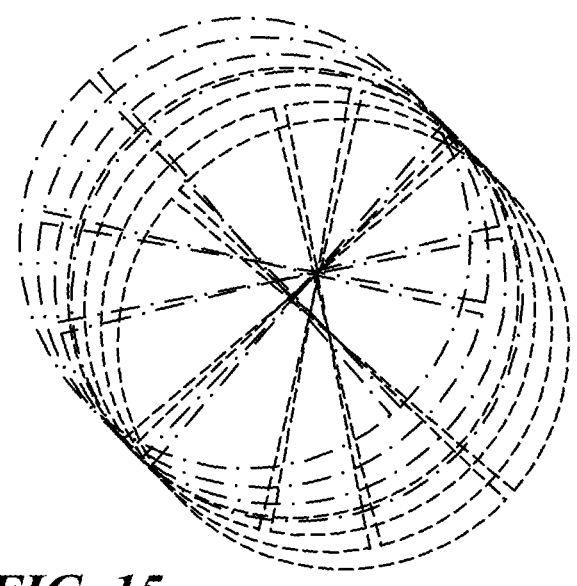
FIG. 15a shows an example receive coil configuration with third and fifth order harmonic compensation.
Figure 15B:
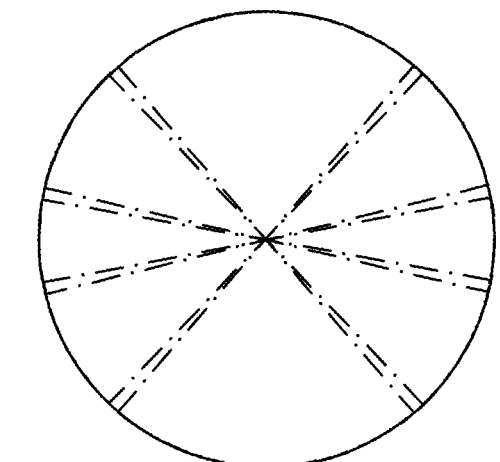
FIG. 15b shows a first set of butterfly coils in FIG. 15a connected in series and FIG. 15c shows the other set of butterfly coils in FIG. 15a connected in series.
Figure 15C:
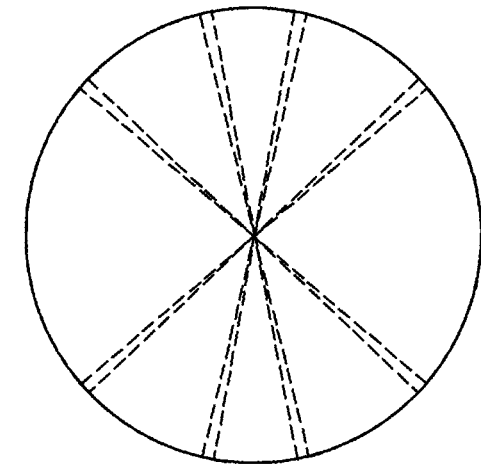
Figure 15D:
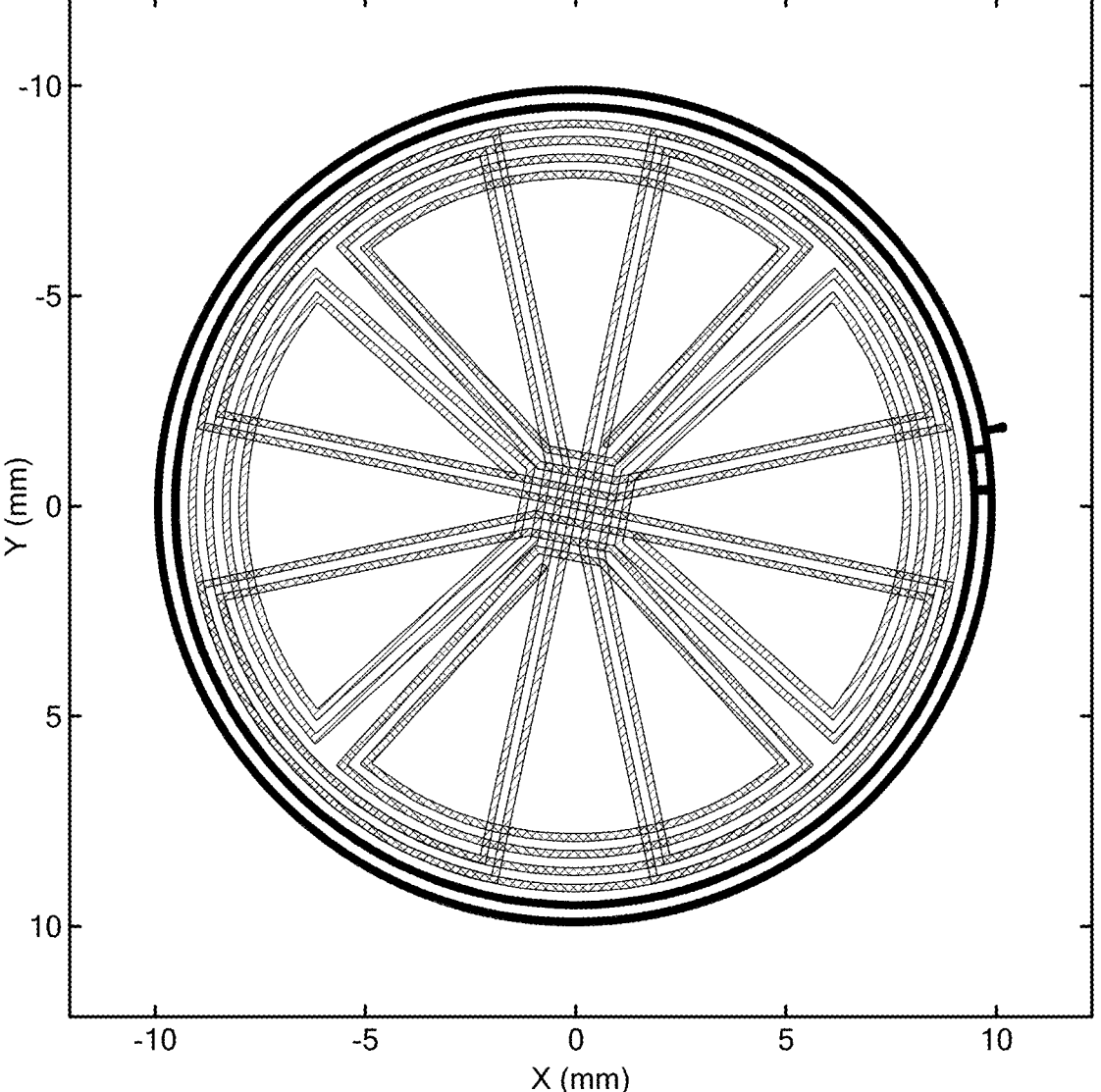
FIG. 15d shows a PCB layer coil implementation.

FIG. 14*a* shows cosine vertical error, FIG. 14*b* shows sine vertical error, and FIG. 14*c* shows the corresponding angle error decrease from 1.7° down to 0.4° angle error. Because the residual vertical error is fifth harmonics after third order harmonic compensation, one can compensate for the fifth harmonics with additional coils, such as by duplicating the two constituent coils by 36° (180°/5), as shown in FIG. 15*a*. FIG. 15*b* is intended to more easily enable cosine butterfly coils to be seen and FIG. 15*c* is intended to more easily enable sine butterfly coils to be seen. FIG. 15*d* shows a PCB layer coil implementation similar to that shown in FIG. 11E. Each signal path is made of four pairs of butterfly coils (the tilt is ±12°; ±48°). Example angle configurations are set forth below:

$$48 = 60/2 + 36/2$$

$$12 = 60/2 - 36/2$$

$$-12 = -60/2 + 36/2$$

$$-48 = -60/2 - 36/2$$

In the illustrated embodiment, angle calculation to compensate for harmonics {n1, n2, n3 . . . } can be represented as angles the sum over i of ±90°/n_i.

Figure 15E:
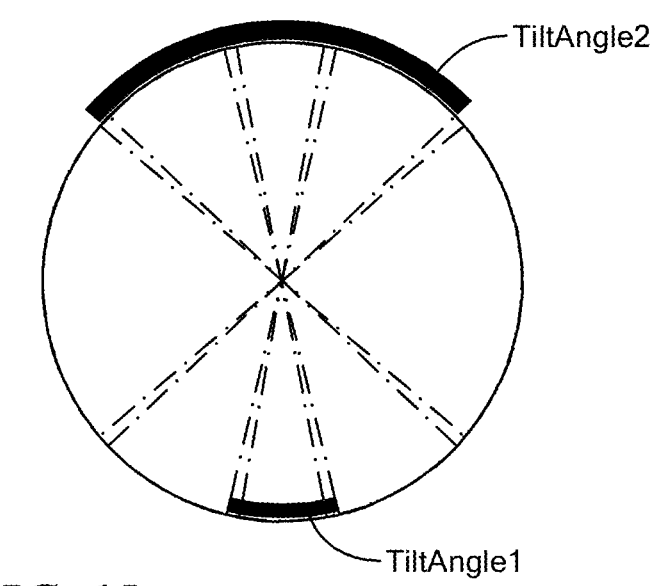
FIG. 15e shows a coil configuration having first and second tilt angles.
Figure 15F:
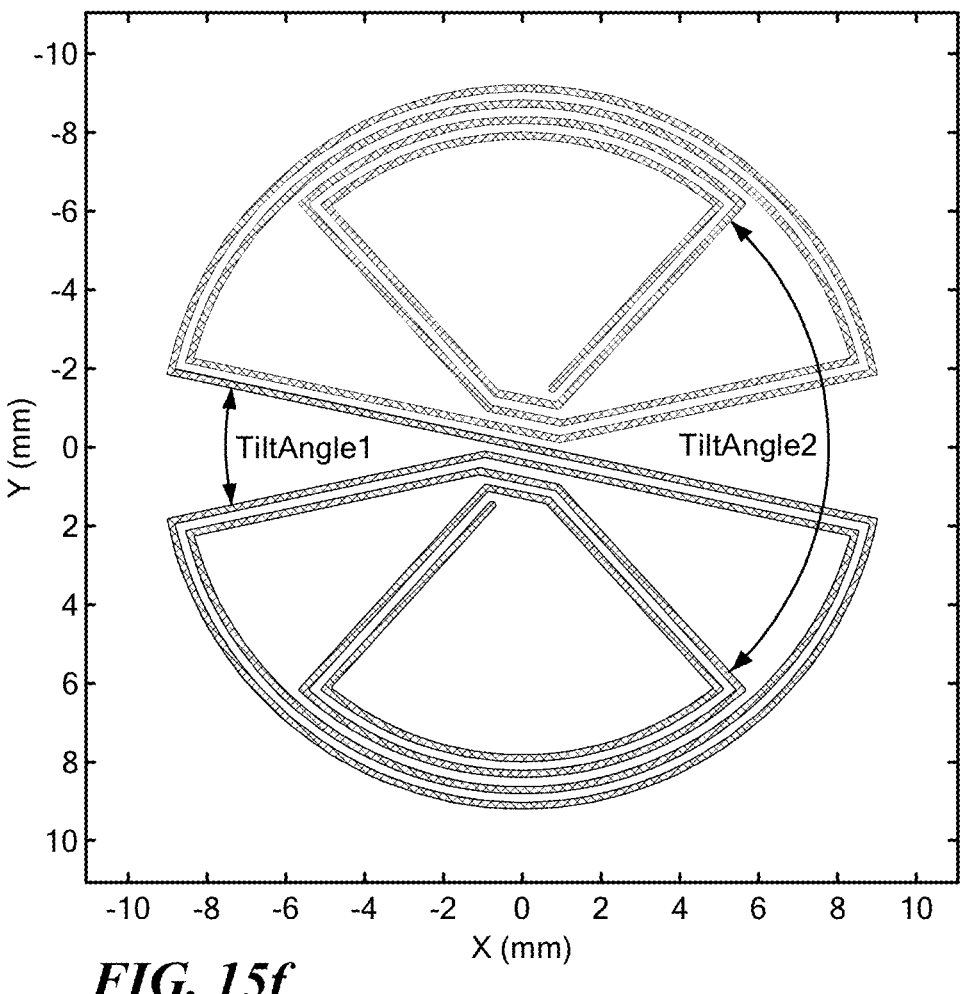
FIGS. 15f and 15g show the coils and tilt angle separately for a single PCB layer embodiment.
Figure 15G:
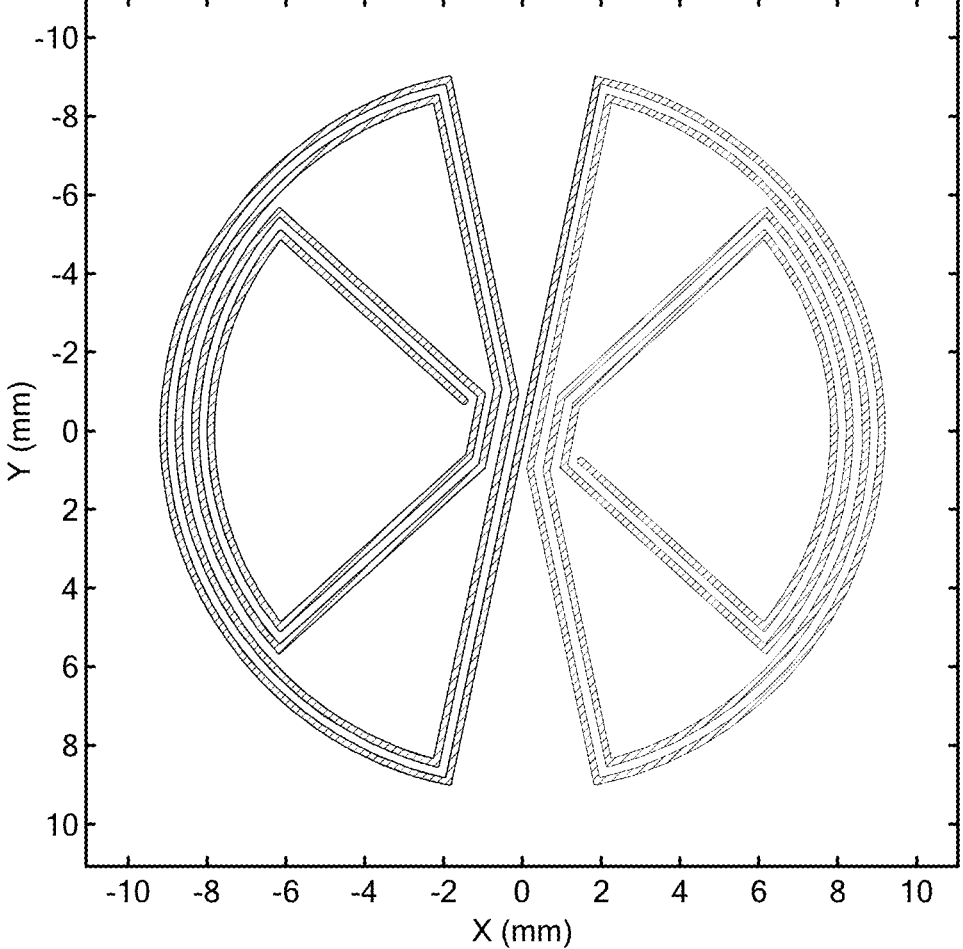

FIG. 15*e* shows a coil configuration having first and second tilt angles and FIGS. 15*f* and 15*g* show the coils and tilt angle separately for a single PCB layer embodiment. This type of coil configuration yields the same benefits as basic butterfly coil configurations but only requires two layers per alternative coil whatever the number of harmonics to be compensated. Basic butterfly coil set requires 2^(number of harmonics). In layer coil configurations, most of the coil is on a single layer and the closure of the coil passes through a second layer.

Figures 16A, 16B, 16C:
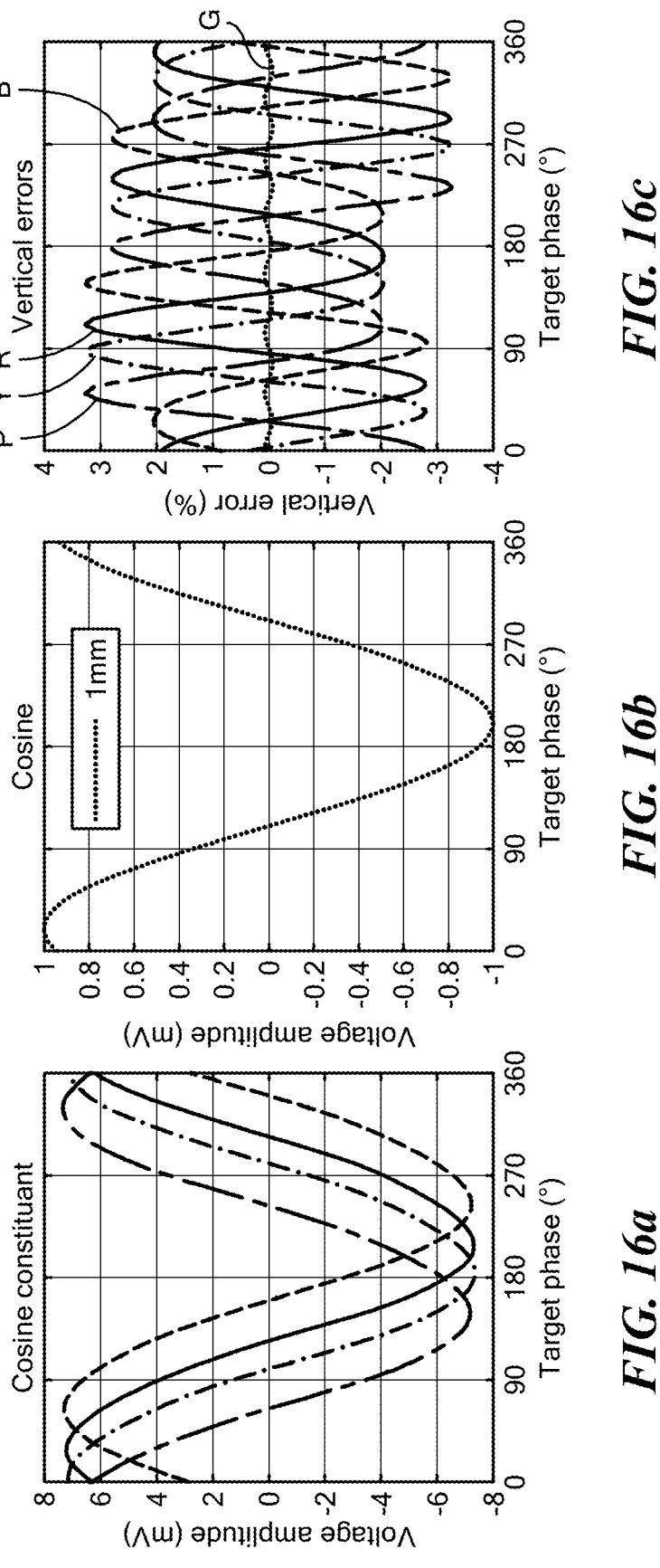
Figures 17A, 17B, 17C:
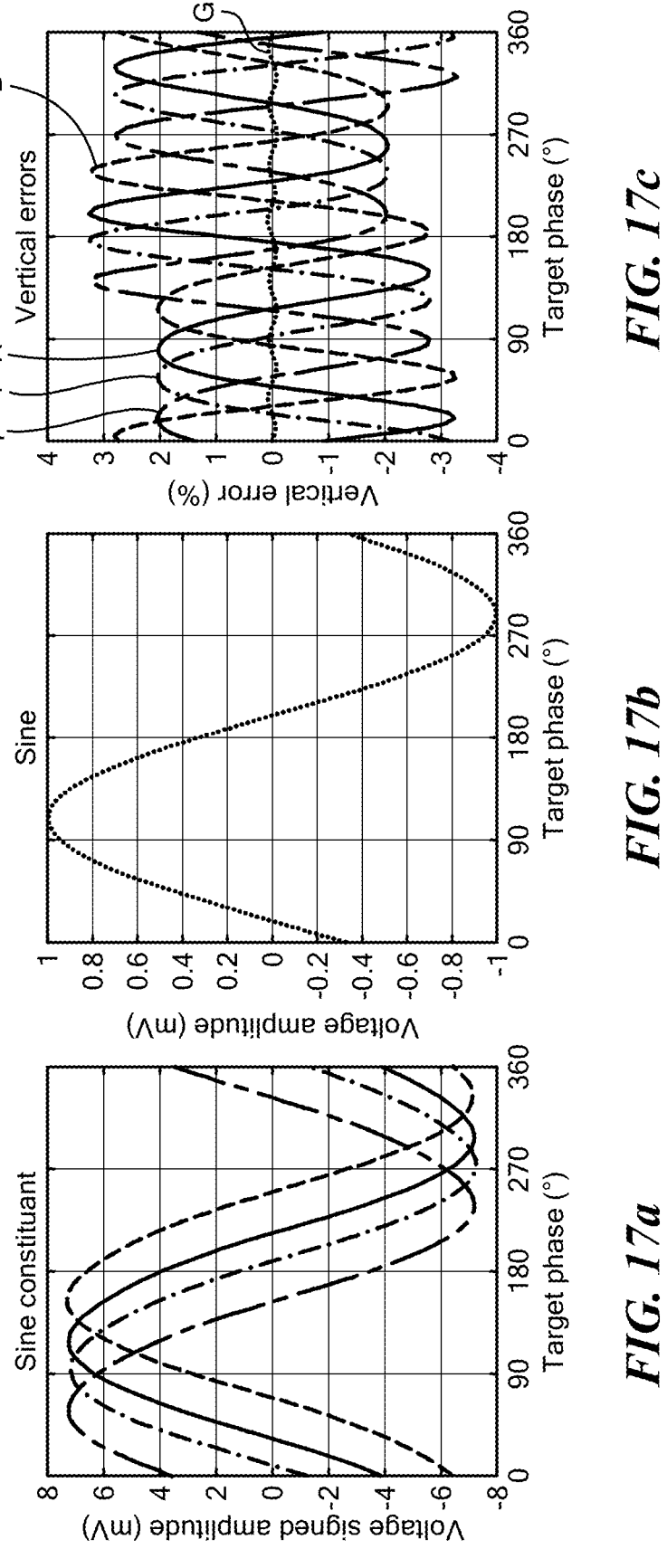

FIGS. 16*a*, 17*a* show plots for the signal from each constituent coils of the respective sine and cosine signal paths. FIGS. 16*b*, 17*b* shows plots for the normalized sum of all constituents of each signal path. FIGS. 16*c*, 17*c* represent the corresponding vertical error B, R, Y, P for the constituent coil signals and G for the full sine and cosine signals). The vertical error drops from 0.7% (with 3$^{rd}$ harmonics correction) down to 0.04% with third and fifth harmonics correction.

Figures 18A, 18B, 18C:
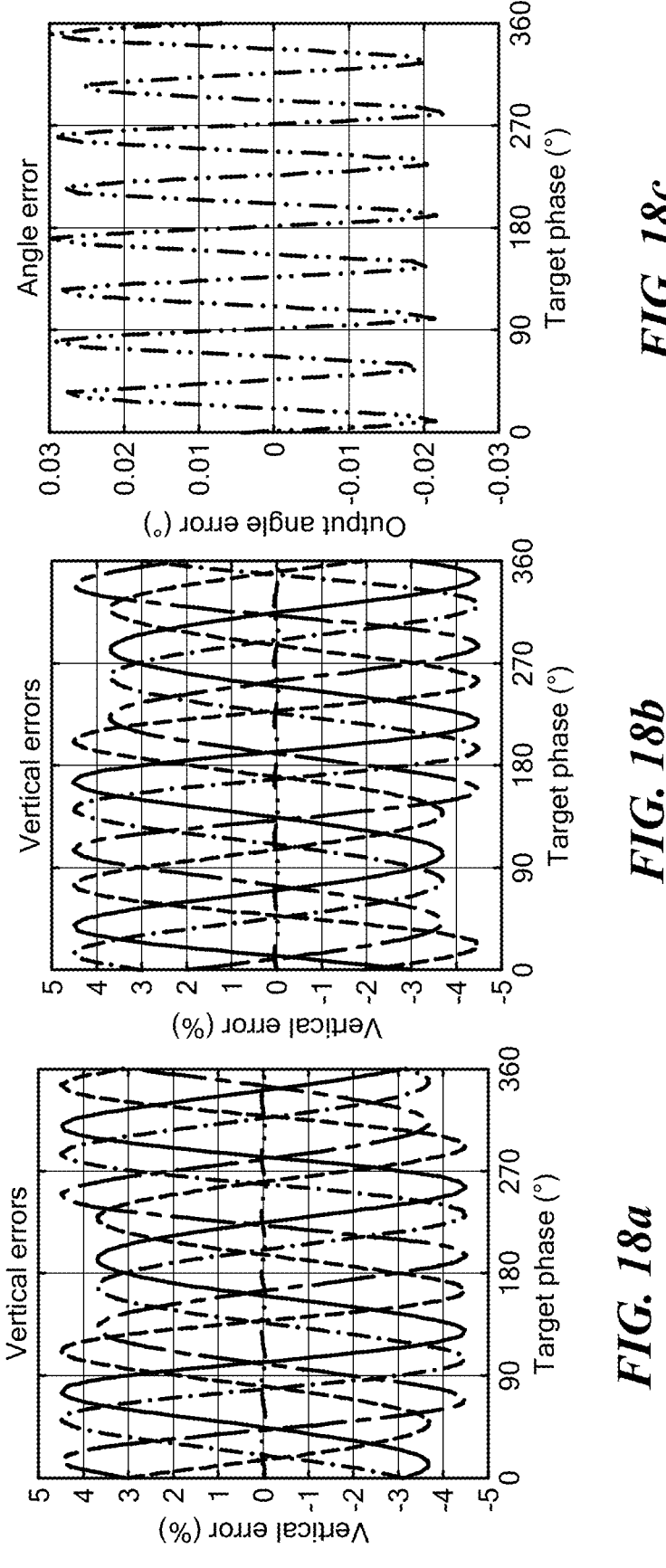

FIG. 18*a,b* show vertical errors for respective sign and cosine channels for four coils per channel. FIG. 18*c* shows corresponding angle error drops from 0.4° (with third harmonics correction) down to 0.03° with both third and fifth harmonics. The residual vertical error is now seventh harmonics. In embodiments, error can be further reduced by cloning constituent coils and tilting them by 25.7° (180°/7).

Table 1 below shows various tilts, vertical errors and angle errors for the different configurations of harmonics correction.

TABLE 1

| Harmonic compensation | None | Third | Third & fifth |
|---|---|---|---|
| Tilt angles | 0° | ±30° | ±12°; ±48° |
| Vertical error | ±3.2% | ±0.7% | ±0.04% |
| Angle error dynamics | ±1.7° | ±0.4% | ±0.03° |

Embodiments of the disclosure allow increased angle accuracy, e.g., 57× better, with third and fifth harmonics correction at the transducer level without changes to front end processing. In addition, example transducer embodiments provide increased accuracy without an increase in PCB real estate.

Figures 19A, 19B:
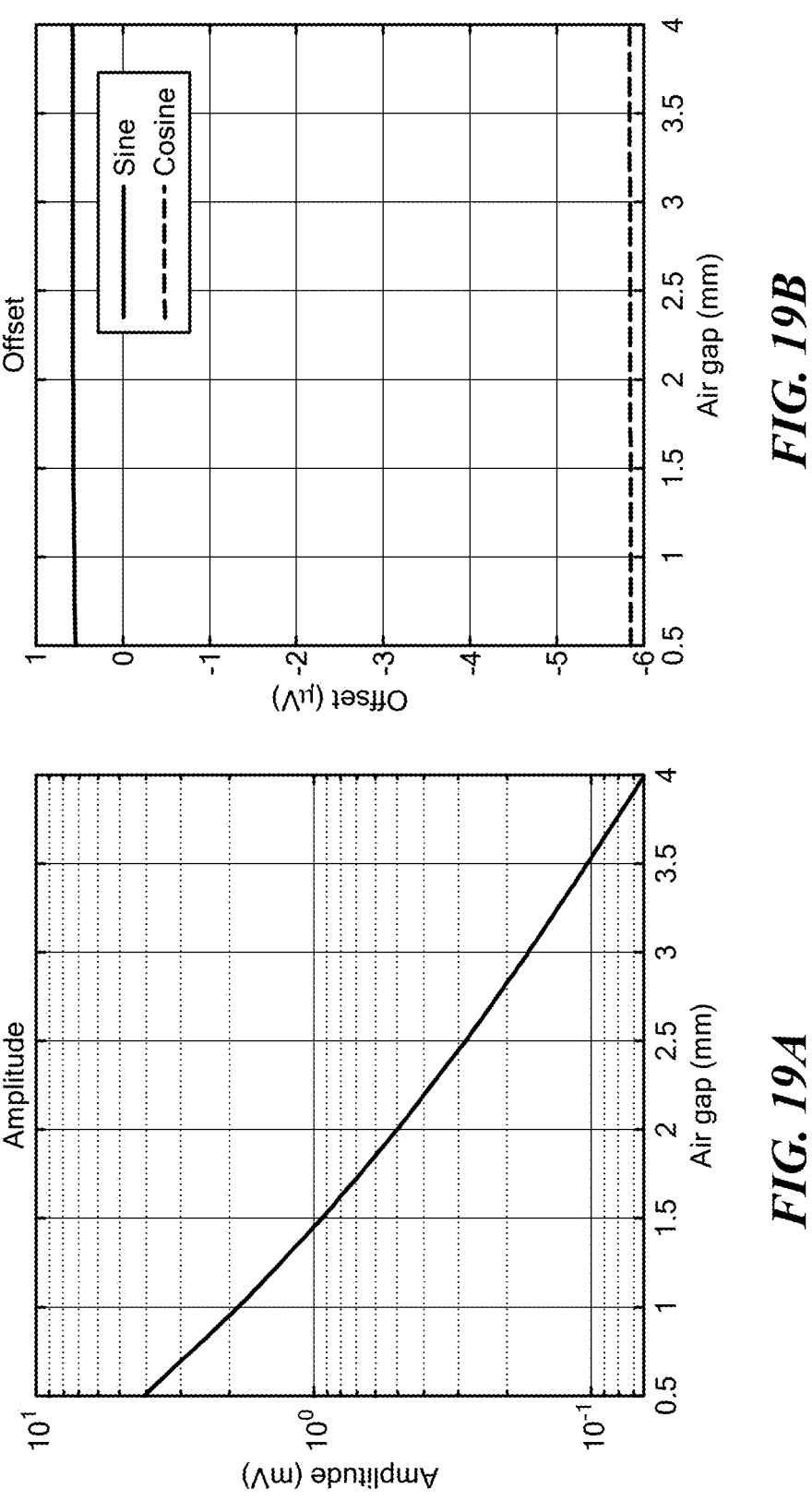
FIG. 19A shows amplitude versus air gap and FIG. 19B shows sine and cosine offset versus airgap for an example sensor.

FIG. 19A shows amplitude in mV versus airgap distance in mm and FIG. 19B shows offset in u V versus airgap in mm for sine and cosine signals which demonstrate that offset is very low (in comparison with amplitude) and constant over air gap so that it can be calibrated out once and for all at the very beginning.

Figure 20:
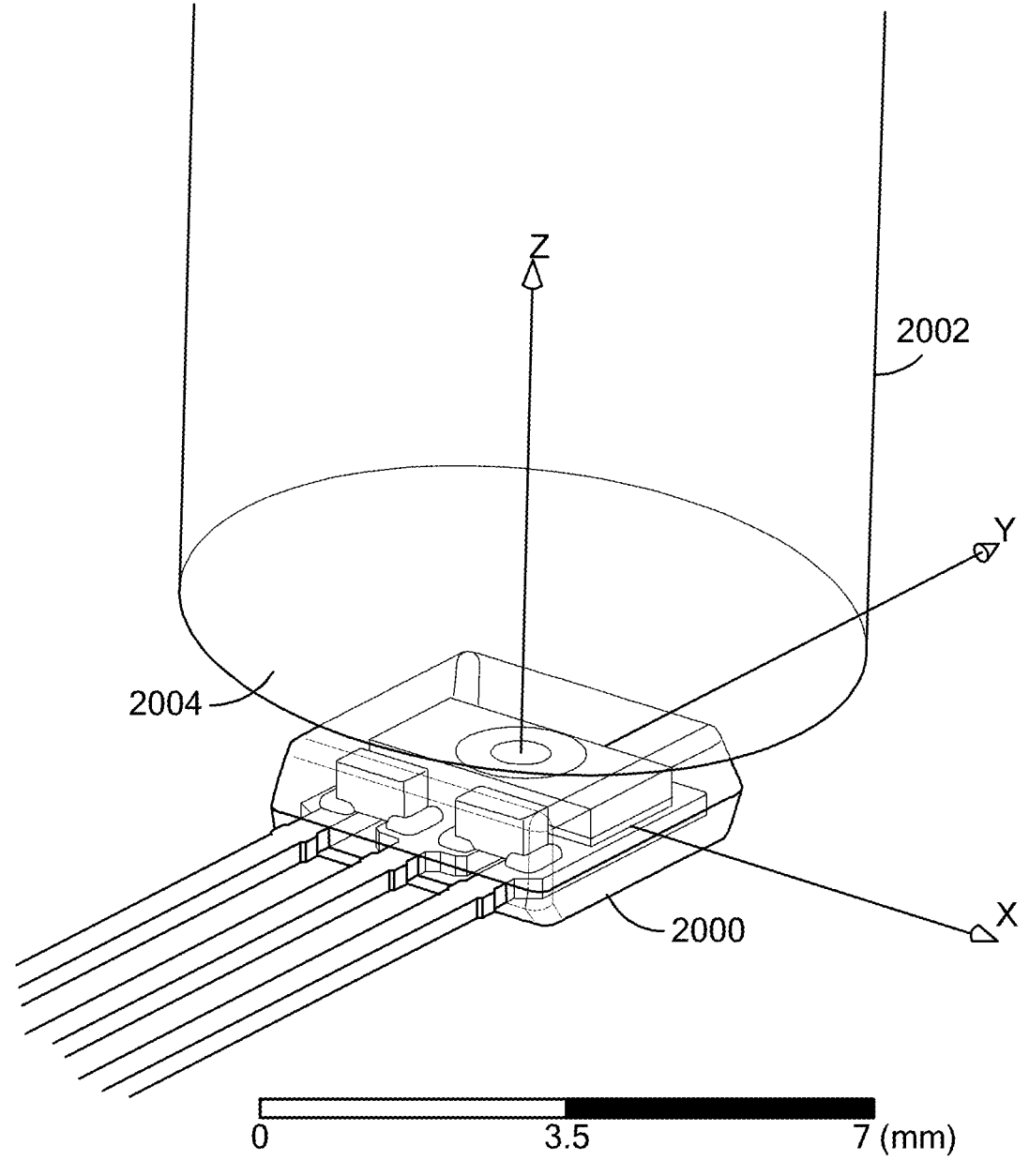
FIG. 20 shows an example sensor IC package positioned in relation to a target.

FIG. 20 shows an example embodiment of an angular position sensor IC package 2000 with a target 2002 at a given air gap. The target 2002 is shown as a cylinder having a cut end 2004. The sensor 2000 has a give die size that allows for a 1.5 mm diameter coil in the example embodiment. A 1.3 mm from die-face to target center results in the order of a 1 mm airgap from package face of the IC package 2000 to lowest portion of the target 2002, e.g., aN 8 mm diameter rod.

As used herein, the term "magnetic field sensor" is used to describe a circuit that uses a magnetic field sensing element, generally in combination with other circuits. Magnetic field sensors are used in a variety of applications, including, but not limited to, an angle sensor that senses an angle of a direction of a magnetic field, a current sensor that senses a magnetic field generated by a current carried by a current-carrying conductor, a magnetic switch that senses the proximity of a ferromagnetic object, a rotation detector that senses passing ferromagnetic articles, for example, magnetic domains of a ring magnet or a ferromagnetic target (e.g., gear teeth) where the magnetic field sensor is used in combination with a back-biased or other magnet, and a magnetic field sensor that senses a magnetic field density of a magnetic field.

As used herein, the terms "target" and "magnetic target" are used to describe an object to be sensed or detected by a magnetic field sensor or magnetic field sensing element. The target may comprise a conductive material that allows for eddy currents to flow within the target, for example a metallic target that conducts electricity.

Figure 21:
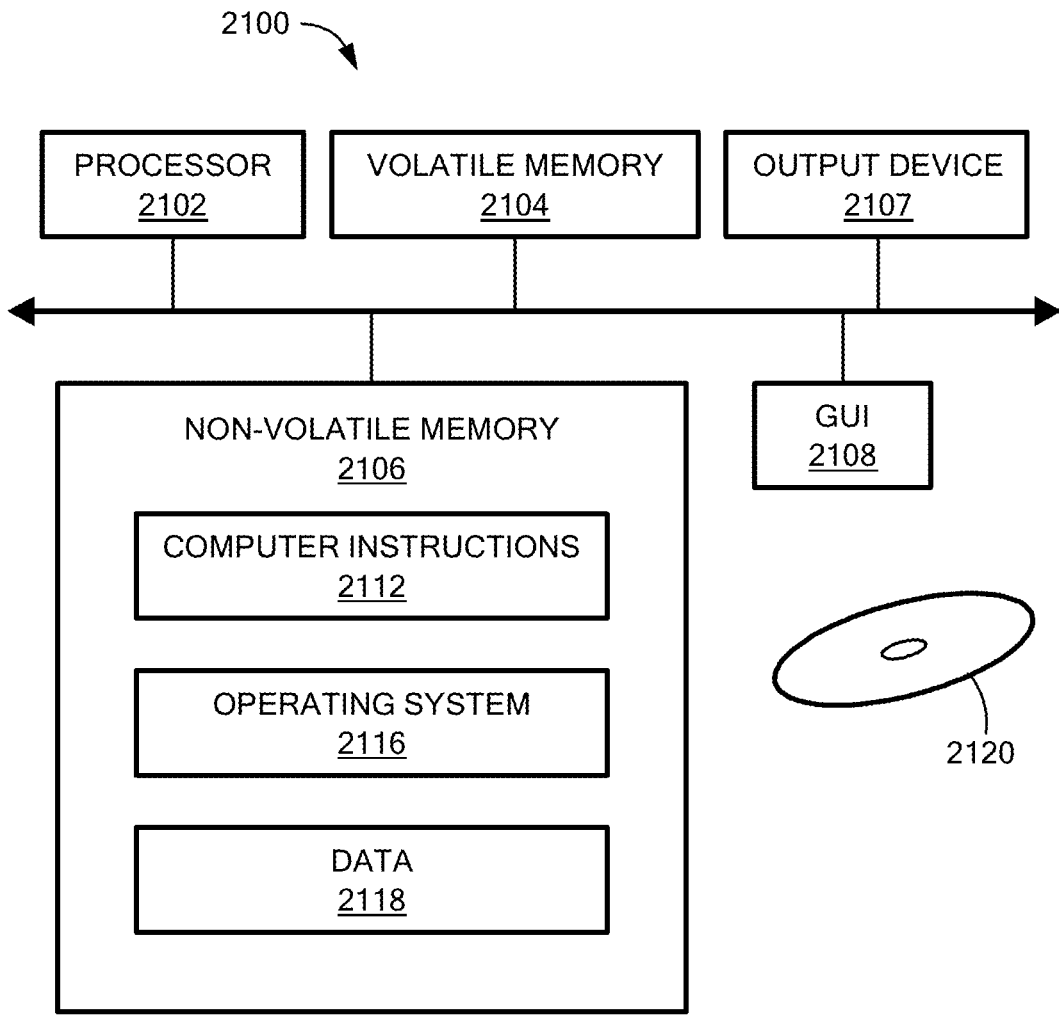
FIG. 21 is a schematic representation of an example computer that can perform at least a portion of the processing described herein.

FIG. 21 shows an exemplary computer 2100 that can perform at least part of the processing described herein. The computer 2100 includes a processor 2102, a volatile memory 2104, a non-volatile memory 2106 (e.g., hard disk), an output device 2107 and a graphical user interface (GUI) 2108 (e.g., a mouse, a keyboard, a display, for example). The non-volatile memory 2106 stores computer instructions 2112, an operating system 2116 and data 2118. In one example, the computer instructions 2112 are executed by the processor 2102 out of volatile memory 2104. In one embodiment, an article 2120 comprises non-transitory computer-readable instructions.

Processing may be implemented in hardware, software, or a combination of the two. Processing may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing and to generate output information.

The system can perform processing, at least in part, via a computer program product, (e.g., in a machine-readable storage device), for execution by, or to control the operation of, data processing apparatus (e.g., a programmable processor, a computer, or multiple computers). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer. Processing may also be implemented as a machine-readable storage medium, configured with a computer program, where upon execution, instructions in the computer program cause the computer to operate.

Processing may be performed by one or more programmable processors executing one or more computer programs to perform the functions of the system. All or part of the system may be implemented as, special purpose logic circuitry (e.g., an FPGA (field programmable gate array) and/or an ASIC (application-specific integrated circuit)).

Having described exemplary embodiments of the invention, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

Elements of different embodiments described herein may be combined to form other embodiments not specifically set forth above. Various elements, which are described in the context of a single embodiment, may also be provided separately or in any suitable subcombination. Other embodiments not specifically described herein are also within the scope of the following claims.

What is claimed is:

1. A sensor, comprising:
a main coil to direct a magnetic field at a rotatable target for inducing eddy currents in the target;
a receive coil having sine and cosine coils for detecting a reflected magnetic field from the target wherein each of the sine and cosine coils is configured such that an asymmetric reflected field from the target seen by the sine and cosine coils corresponds to conductive properties of a surface of the target in relation to the main coil and the receive coil,
wherein the sine coil comprises first and second constituent coils arranged to compensate for third order harmonic effects, each of the first and second constituent coils of the sine coil having a shape of a first circle with a twist along a diameter of the first circle, and
wherein the cosine coil comprises first and second constituent coils arranged to compensate for the third order harmonic effects, each of the first and second constituent coils of the cosine coil having a shape of a second circle with a twist along a diameter of the second circle; and
a processing module to process the reflected magnetic field from the receive coil for determining an angular position of the target,
wherein the first constituent coil of the sine coil includes a pair of first wings and the second constituent coil of the sine coil includes a pair of second wings, one of the second wings being offset by an angle of 60 degrees from one of the first wings,
wherein the first constituent coil of the sine coil and the second constituent coil of the sine coil are stacked, such that the first constituent coil of the sine coil is disposed above or below the second constituent coil of the sine coil.

2. The sensor according to claim 1, wherein the first and second constituent coils of the sine coil are formed in a multi-layer printed circuit board (PCB).

3. The sensor according to claim 1, wherein the sine coil further includes third and fourth constituent coils that are configured to compensate for n-order harmonic effects.

4. The sensor according to claim 3, wherein the n-order harmonic effects are seventh order harmonic effects.

5. The sensor according to claim 1, wherein the sensor comprises an angle sensor IC package.

6. The sensor according to claim 1, wherein the third order harmonic effects substantially comprise vertical offset error.

7. The sensor according to claim 1, wherein the sine and cosine coils are formed in printed circuit board layers.

8. The sensor according to claim 1, wherein the first constituent coil of the cosine coil and the second constituent coil of the cosine coil are stacked with each other and with the first and second constituent coils of the sine coil, such that the first constituent coil of the cosine coil is disposed above or below the second constituent coil of the cosine coil, and the first constituent coil of the cosine coil is disposed above any of the first and second constituent coils of the sine coil.

9. A method, comprising:
employing, in a sensor, a main coil to direct a magnetic field at a rotatable target for inducing eddy currents in the target;
employing a receive coil having sine and cosine coils for detecting a reflected magnetic field from the target wherein each of the sine and cosine coils is configured such that an asymmetric reflected field from the target seen by the sine and cosine coils corresponds to conductive properties of a surface of the target in relation to the main coil and the receive coil; and
detecting an angular position of the target by processing the reflected magnetic field from the receive coil,
wherein the sine coil comprises first and second constituent coils arranged to compensate for third order harmonic effects, each of the first and second constituent coils of the sine coil having a shape of a first circle with a twist along a diameter of the first circle, and wherein the cosine coil comprises first and second constituent coils arranged to compensate for the third order harmonic effects, each of the first and second constituent coils of the cosine coil having a shape of a second circle with a twist along a diameter of the second circle, wherein the first constituent coil of the sine coil includes a pair of first wings and the second constituent coil of the sine coil includes a pair of second wings, one of the second wings being offset by an angle of 60 degrees from one of the first wings, wherein the first constituent coil of the sine coil and the second constituent coil of the sine coil are stacked, such that the first constituent coil of the sine coil is disposed above or below the second constituent coil of the sine coil.

10. The method according to claim 9, wherein the sine coil further includes third and fourth constituent coils that are configured to compensate for n-order harmonic effects.

11. The method according to claim 9, wherein the first and second constituent coils of the sine coil are formed in a multi-layer printed circuit board (PCB).

12. The method according to claim 10, wherein the n-order harmonic effects are seventh order harmonic effects.

13. The method according to claim 9, wherein the sensor comprises an angle sensor IC package.

14. The method according to claim 9, wherein the third order harmonic effects substantially comprise vertical offset error.

15. The method according to claim 9, wherein the sine and cosine coils are substantially planar.

16. The method according to claim 9, wherein the first constituent coil of the cosine coil and the second constituent coil of the cosine coil are stacked with each other and with the first and second constituent coils of the sine coil, such that the first constituent coil of the cosine coil is disposed above or below the second constituent coil of the cosine coil, and the first constituent coil of the cosine coil is disposed above any of the first and second constituent coils of the sine coil.

* * * * *